(12) United States Patent
Hendrix et al.

(10) Patent No.: US 12,298,574 B2
(45) Date of Patent: May 13, 2025

(54) OPTICAL FIBER MANAGEMENT SYSTEM

(71) Applicant: viaPhoton, Inc., Aurora, IL (US)

(72) Inventors: Walter Mark Hendrix, Richardson, TX (US); James Patrick Nolan, Yorkville, IL (US); Nathan Eric Benton, Wickenburg, AZ (US); Syed Babar Abbas, Richardson, TX (US); Keith Samuel Maranto, Frankfort, IL (US); Elizabeth Grace Dabdoub, Bartlett, IL (US)

(*) Notice: Subject to any disclaimer, the term of this patent is extended or adjusted under 35 U.S.C. 154(b) by 0 days.

(21) Appl. No.: 17/408,239

(22) Filed: Aug. 20, 2021

(65) Prior Publication Data

US 2022/0057585 A1 Feb. 24, 2022

Related U.S. Application Data

(60) Provisional application No. 63/068,255, filed on Aug. 20, 2020.

(51) Int. Cl.
*G02B 6/00* (2006.01)
*G02B 6/38* (2006.01)
*G02B 6/42* (2006.01)
*G02B 6/44* (2006.01)

(52) U.S. Cl.
CPC ......... *G02B 6/4292* (2013.01); *G02B 6/3897* (2013.01); *G02B 6/4452* (2013.01)

(58) Field of Classification Search
CPC .. G02B 6/4292; G02B 6/3897; G02B 6/4452; G02B 6/4471; G02B 6/00
See application file for complete search history.

(56) References Cited

U.S. PATENT DOCUMENTS

| | | | |
|---|---|---|---|
| 4,944,568 A * | 7/1990 | Danbach | G02B 6/4292 439/246 |
| 6,758,600 B2 | 7/2004 | Del Grosso et al. | |
| 6,869,227 B2 | 3/2005 | Del Grosso et al. | |
| 8,184,938 B2 | 5/2012 | Cooke et al. | |
| 8,452,148 B2 | 5/2013 | Cooke et al. | |
| 8,538,226 B2 | 9/2013 | Makrides-Saravanos et al. | |
| 8,712,206 B2 | 4/2014 | Cooke et al. | |
| 8,861,918 B2 * | 10/2014 | Vazquez | A47B 97/00 385/135 |
| 9,020,320 B2 | 4/2015 | Cooke et al. | |
| 10,094,996 B2 | 10/2018 | Cooke et al. | |
| 10,120,153 B2 | 11/2018 | Cooke et al. | |
| 10,281,672 B1 | 5/2019 | Mullsteff | |
| 10,444,456 B2 | 10/2019 | Cooke et al. | |
| 10,551,585 B2 | 2/2020 | Mullsteff | |
| 11,237,342 B2 * | 2/2022 | Iizumi | G02B 6/3878 |
| 2019/0361188 A1 | 11/2019 | Mullsteff | |
| 2022/0066116 A1 * | 3/2022 | Holmberg | G02B 6/4455 |

FOREIGN PATENT DOCUMENTS

WO WO-2013066675 A1 * 5/2013 ........... G02B 6/3887

* cited by examiner

*Primary Examiner* — Jennifer Doan
(74) *Attorney, Agent, or Firm* — Ferguson Braswell Fraser Kubasta PC

(57) ABSTRACT

An apparatus forms a module. The apparatus includes a housing configured to load the module through a front end of a panel. The apparatus includes a connector cluster. The apparatus includes a set of tabs corresponding to a set of securing members that secure the module to a panel.

20 Claims, 23 Drawing Sheets

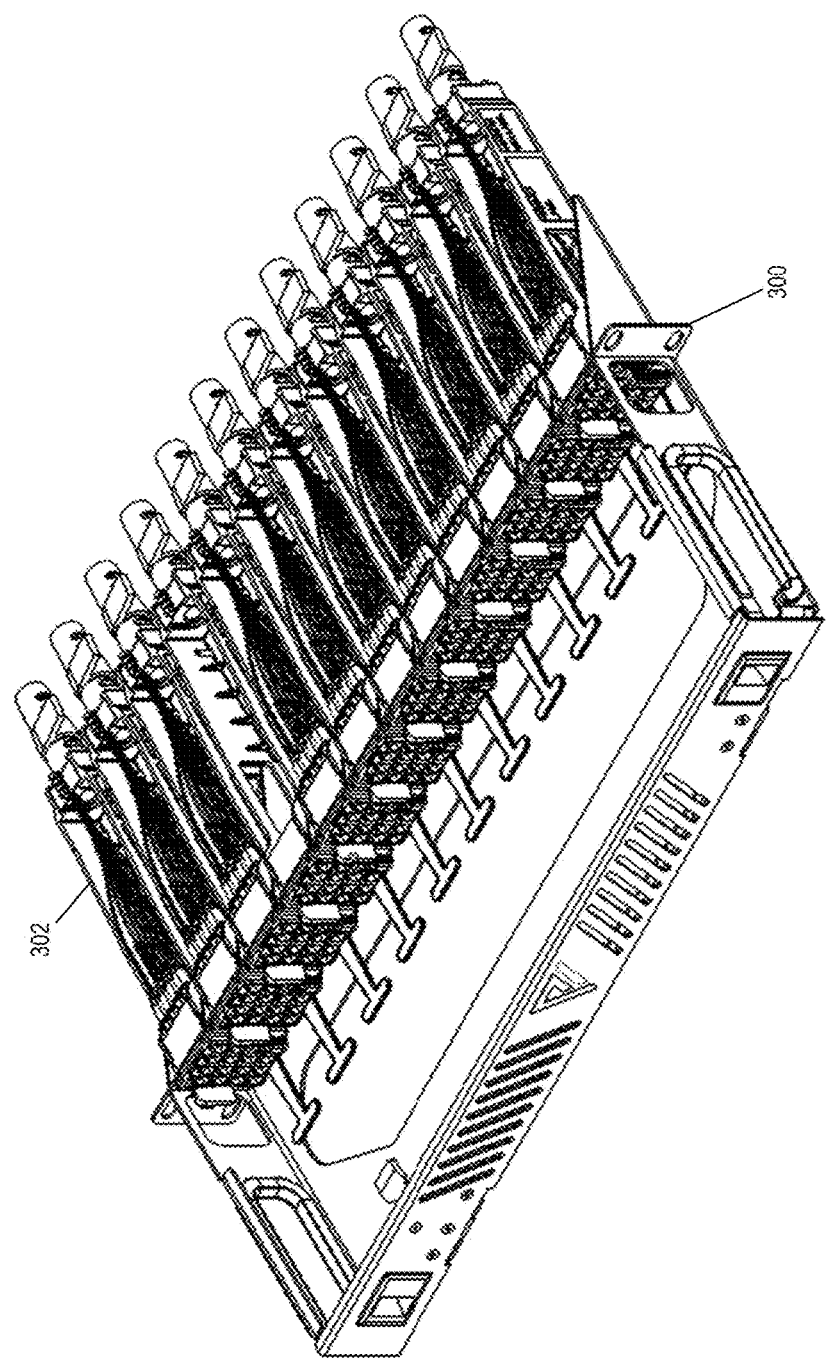

OPTICAL FIBER MANAGEMENT SYSTEM

CROSS REFERENCE TO RELATED APPLICATIONS

This application claims the benefit of U.S. Provisional Application 63/068,255, filed Aug. 20, 2020, which is incorporated by reference herein.

BACKGROUND

Communication cables may be mounted into standard sized enclosures. A challenge is to increase the number of cables and density of cables enclosed by standard sized enclosures.

SUMMARY

In general, in one or more aspects, the disclosure relates to an apparatus formed as a module. The apparatus includes a housing configured to load the module through a front end of a panel. The apparatus includes a connector cluster. The apparatus includes a set of tabs corresponding to a set of securing members that secure the module to a panel.

In general, in one or more aspects, the disclosure relates to an apparatus formed as a module. The apparatus includes a housing configured to load the module through a trunk end of a panel. The apparatus includes a connector cluster. The apparatus includes a reversible polarity based on an orientation of the module with respect to the panel.

In general, in one or more aspects, the disclosure relates to a method of cable management. The method includes installing a trunk cable to a module. The module includes a housing, a connector cluster, and at least one securing member configured to secure the module to a panel. The method includes fitting the module to the panel through one of a front of the panel and a rear of the panel based on a configuration of the at least one securing member.

Other aspects of the invention will be apparent from the following description and the appended claims.

BRIEF DESCRIPTION OF DRAWINGS

FIG. 3A, FIG. 3B, FIG. 3C, FIG. 3D, FIG. 3E, FIG. 3F, FIG. 3G, FIG. 3H, FIG. 3I, FIG. 4A, FIG. 4B, FIG. 4C, FIG. 4D, FIG. 4E, FIG. 4F, FIG. 4G, FIG. 5A, FIG. 5B, FIG. 5C, FIG. 5D, FIG. 5E, FIG. 5F, FIG. 6A, FIG. 6B, FIG. 6C, FIG. 6D, FIG. 7, FIG. 8A, FIG. 8B, FIG. 8C, FIG. 9A, FIG. 9B, and FIG. 9C show examples in accordance with disclosed embodiments.

DETAILED DESCRIPTION

Figure 1:
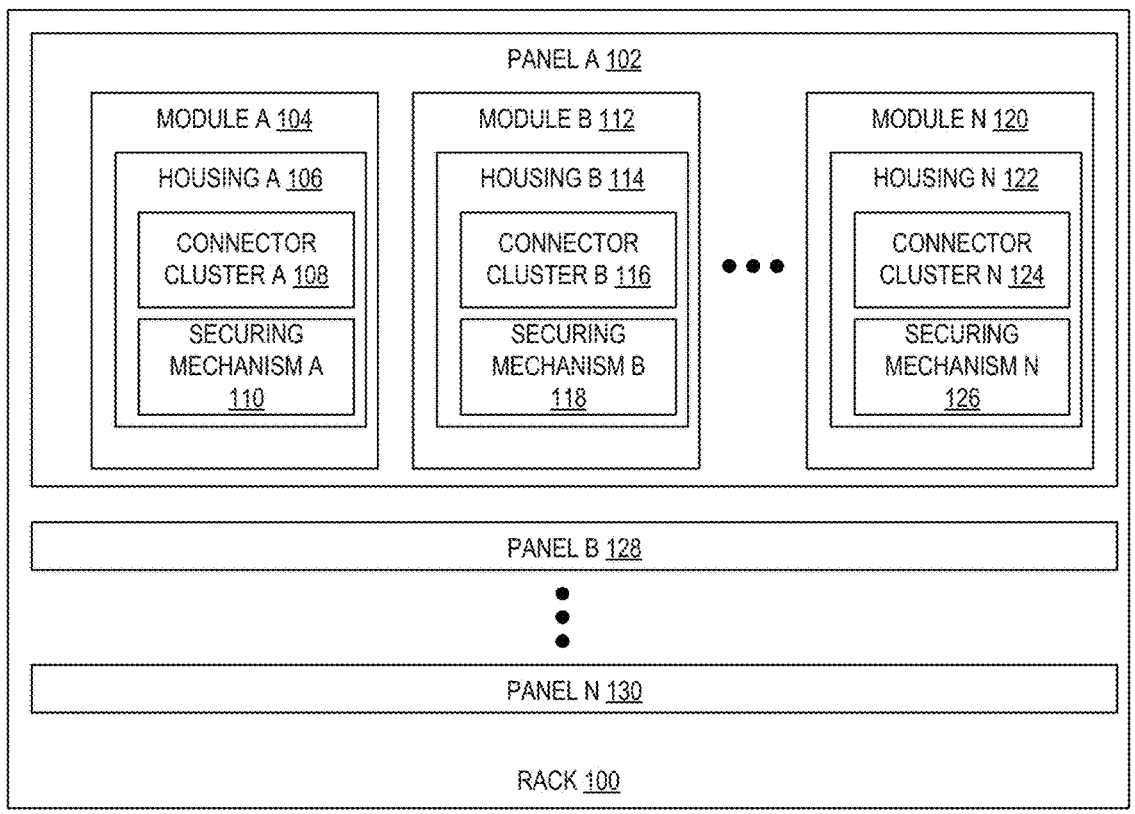
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure relates to fiber optic cable manufacturing, generally, and more specifically, to a system and method for organizing fiber optic cables.

In general, embodiments of the disclosure increase the number of cables serviceable with standard enclosures using modules. The modules may be configured for optical fiber cables, electrical cables, combinations thereof, etc. The modules may be configured as front-loading modules and rear-loading modules. The modules for optical fiber cables may include splices within the module.

FIG. 1 shows a diagram of embodiments that are in accordance with the disclosure. The embodiments of FIG. 1 may be combined and may include or be included within the features and embodiments described in the other figures of the application. The features and elements of FIG. 1 are, individually and as a combination, improvements to cable management technology and systems. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

Turning to FIG. 1, the rack (100) is a standardized enclosure for mounting multiple equipment modules, including electrical and optical components. The rack (100) may be a 19-inch rack, a 23-inch rack, etc. The rack (100) includes the panel A (102), the panel B (128), and the panel N (130).

The panels A (102) through N (130) are enclosures for the modules (including the modules A (104) through N (120)) that route cables through the rack (100). The panel A (102) includes the module A (104), the module B (112), and the module N (120). Each of the panels A (102) through N (130) may route and connect optical fiber cables, electrical cables, or both.

The module A (104) routes cable through the panel A (102). The module A (104) includes the housing A (106). The modules A (104) through N (120) provide granular access to the cables connected to the panel A (102) and the rack (100) during service, maintenance, and installation. For example, instead of uninstalling the rack (100) or the panel A (102) to reach a cable, a module A (104) within the panel A (102) may be removed to access a cable for installation or maintenance. Each of the modules A (104) through N (120) may route and connect optical fiber cables, electrical cables, or both.

The housing A (106) encloses the module A (104). The housing A (106) includes the connector cluster A (108) and the securing mechanism A (110).

The connector cluster A (108) couples cables from a trunk cable from a rear end (also referred to as a trunk end) of the module A (104) to cables connected to a front end of the module A (104). The connector cluster A (108) may include one or more fiber optic couplers, electrical couplers, etc. The connector cluster A (108) may be removably fixed to the housing A (106) using a bracket.

The securing mechanism A (110) is a portion of the module A (104) that secures the module A (104) to the panel A (102). In one embodiment, the securing mechanism A (110) may include a set of tabs on a front end of the module A (104). In one embodiment, the securing mechanism A (110) may include a recess configured to lock against a spring clip.

The module B (112) includes the housing B (114), which includes the connector cluster B (116) and the securing mechanism B (118). The components in the module B (112) may be different from the similarly named components of the module A (104). For example, the housing A (106) may include an open top and fiber optic couplers when the housing B (114) may include an enclosed top with electric couplers.

The module N (120) includes the housing N (122), which includes the connector cluster N (124) and the securing mechanism N (126). The components of the module N (120) may be similar to those of the modules A (104) and B (112).

Figure 2:
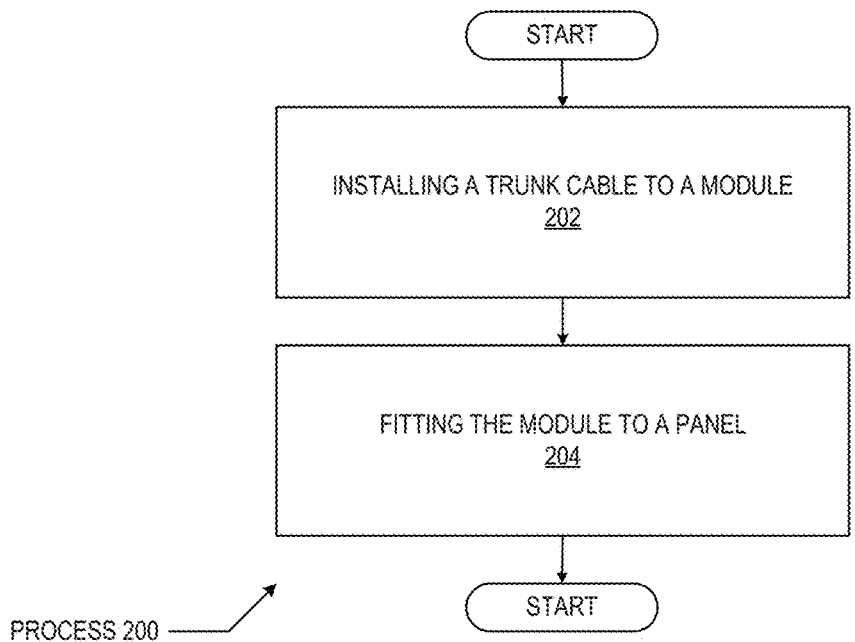
FIG. 2 shows a flowchart in accordance with disclosed embodiments.

FIG. 2 shows a process for routing cable. The embodiments of FIG. 2 may be combined and may include or be included within the features and embodiments described in the other figures of the application. The features of FIG. 2 are, individually and as an ordered combination, improvements to cable management technology and systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively.

Turning to FIG. 2, the process (200) routes cable through a rack. Routing cable through the rack organizes the cable.

At (202), a trunk cable is installed to a module. The trunk cable may be a fiber optical or electrical cable. Fibers of a fiber optical cable may be spliced with other fibers inside the module. The cabling inside the module includes connectors that mount to an internal side of a set of couplers of a connector cluster. The exterior side of the couplers, of the connector cluster, may face a front end of the panel, ready to receive the connectors of fiber optical or electrical cables The connector cluster may be removably fixed to a housing of the module. During maintenance or installation, the connector cluster may be removed from the module to attach or reattach the cables to the connector cluster without having to reach through the module. After attaching the cables to the connector cluster, the connector cluster may by placed into a housing of the module. The polarity of the module may also be reversed by reinstalling the connector cluster upside down (instead of right side up).

At (204), the module is fitted to a panel. The module may be one of multiple modules fitted to a panel. In one embodiment, the panel includes slots for twelve modules. A securing mechanism of the module engages with the panel to inhibit movement of the module with respect to the panel. Modules may be installed from the front or rear of the panel.

FIGS. 3A through 3I, 4A through 4G, 5A through 5F, 6A through 6D, 7, 8A through 8C, and 9A through 9C show example embodiments in accordance with the disclosure. The embodiments shown in FIGS. 3A through 9C may be combined and may include or be included within the features and embodiments described in the other figures of the application. The features and elements of FIGS. 3A through 9C are, individually and as a combination, improvements to cable management technology and systems. The various features, elements, widgets, components, and interfaces shown in FIGS. 3A through 9C may be omitted, repeated, combined, and/or altered as shown. Accordingly, the scope of the present disclosure should not be considered limited to the specific arrangements shown in FIGS. 3A through 9C.

Figure 3B:
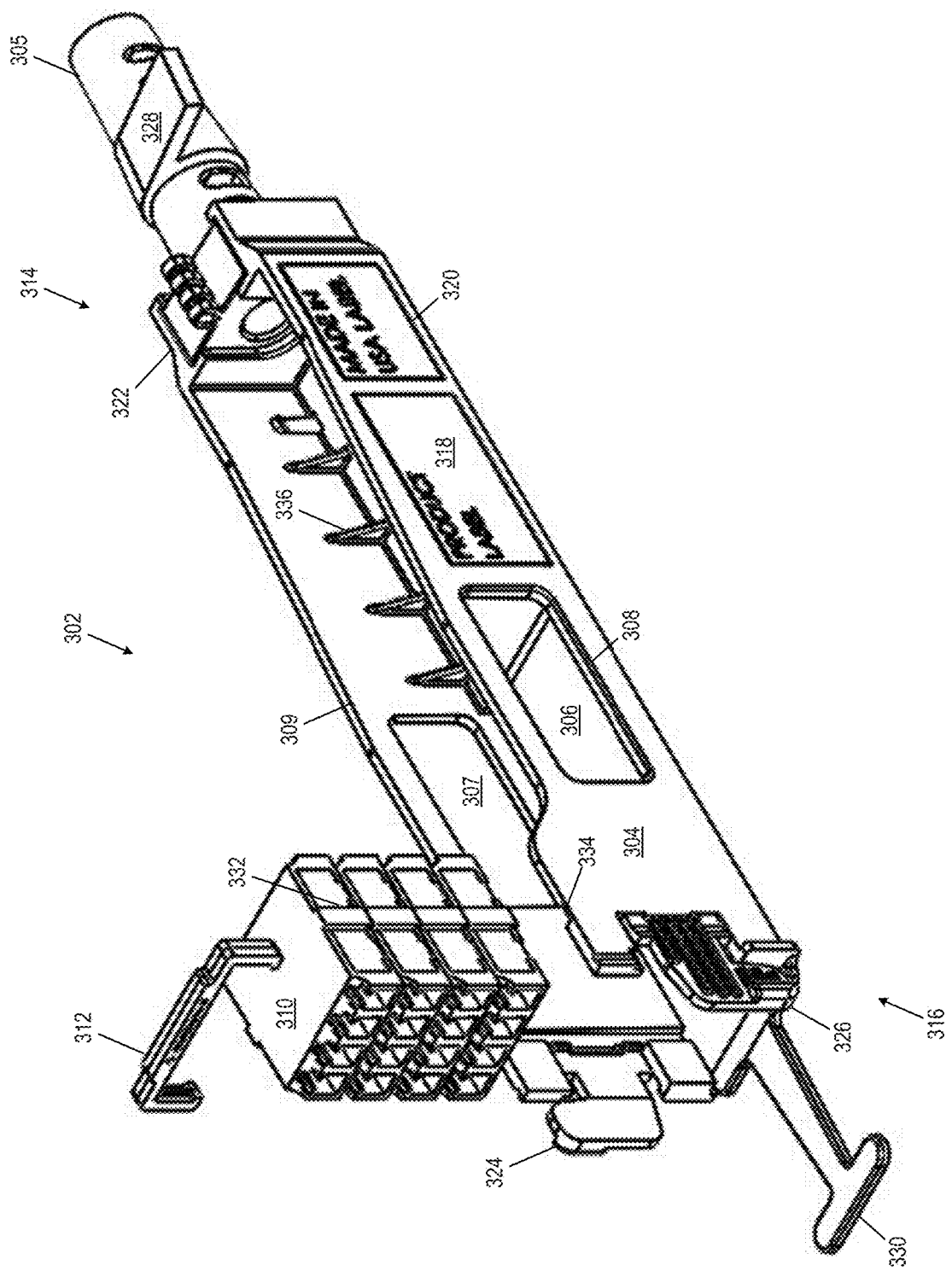

FIGS. 3A through 3I show the panel (300) with the modules (302). Turning to FIG. 3A, the panel (300) includes the modules (302). The modules (302) are front-loading modules. In one embodiment, the panel (300) may be configured to fit a 19-inch rack. In one embodiment, the panel (300) has a 1 U panel height of about 1.75 inches (44.45 millimeters) and a width of about 19 inches (482.6 millimeters). In one embodiment, the panel (300) includes spaces for 12 of the modules (302). Each of the modules (302) includes multiple optical fiber couplers.

In one embodiment, each module (302) includes 16 LC (Lucent connector) couplers and the panel (300) includes 192 optical couplers for a 19-inch rack. Additional modules and couplers may be included in panels for larger racks. For example, a panel for a 23-inch rack may include space for 14 modules and 224 couplers. Different types of couplers and connectors may be used in addition to LC couplers, including MPO (multi fiber push on) connectors, MTP (multi-fiber termination push-on) couplers, etc.

Turning to FIG. 3B, the module (302) is illustrated with an exploded view. The module (302) includes the housing (304), the strain relief (305), the connector cluster (310), the retainer clip (312), and the labels (318) and (320).

The housing (304) encloses the electrical or optical cabling between the strain relief (305) and the connector cluster (310) and secures cabling to the panel (300). The housing (304) includes the openings (306), (307), (308), and (309), the support members (336), the rear end (314), the front end (316), and the labels (318) and (320).

The openings (306) through (309) provide access to cables and connectors that are disposed within the module (302). The opening (306) is on a bottom of the housing (304). The opening (307) is a side opening of the housing (304). The opening (308) is second side opening of the module (302). The opening (309) is a top opening of the housing (304).

The strain relief (305) inhibits a trunk cable (after installation into the strain relief (305)) from bending. The strain relief (305) inserts into the relief receptor (322) at the rear end (314) of the housing (304). The strain relief (305) is secured with the strap (328).

The connector cluster (310) is a cluster of connectors. In one embodiment, the connector cluster (310) includes four quad LC couplers (for a total of 16 couplers) that have been adhered together to form a single unit. Different connectors and cluster may be used in different embodiments. In one embodiment, a side of the connector cluster (310) includes the guide (332) that fits to the inversely shaped guide (334) of the housing (304). The retainer clip (312) secures the connector cluster (310) to the housing (304).

The support members (336) provide rigidity and support to the sides and bottom of the housing (304). In one embodiment, the support members (336) are triangularly shaped.

The rear end (314) of the housing (304) includes the relief receptor (322) for the strain relief (305). The rear end (314) is configured to be coupled to a trunk cable or set of cables.

The front end (316) includes the tabs (324) and (326) and the handle (330). The front end (316) is configured to be coupled to multiple fan out cables. The handle (330) may be used to position the module (302) within the panel (300).

The labels (318) and (320) are on a side of the housing (304). In one embodiment, the labels (318) and (320) are formed into the housing (304) (e.g., embossed). In one embodiment, the labels (318) and (320) are stickers attached to the housing (304). The label (318) identifies the module (302). The label (320) identifies a country of origin for the module (302).

Figure 3C:
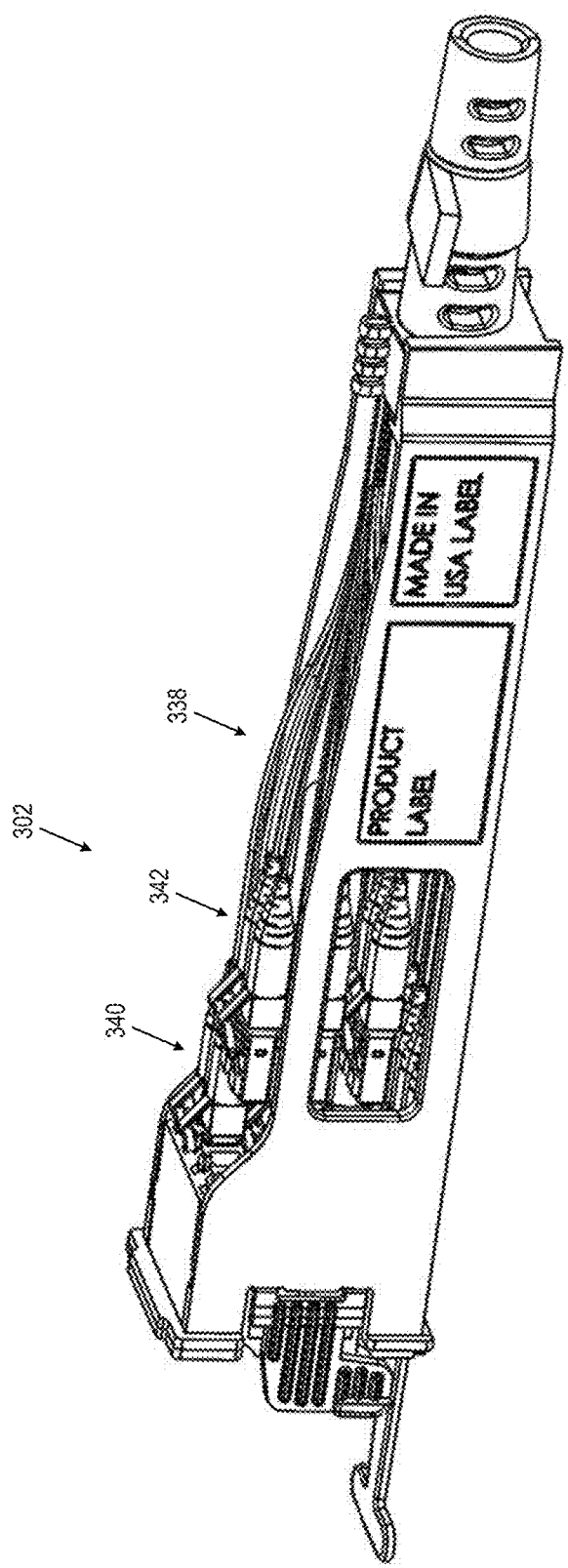

Turning to FIG. 3C, a side view of the module (302) is illustrated. The fanout cables (338) are accessible through the openings (306), (307), (308), and (309) of the module (302). The connectors (340) of the fanout cables (338) are inserted into the connector cluster (310). The connectors (342) of the fanout cables (338) are not inserted into the connector cluster (310).

Figure 3D:
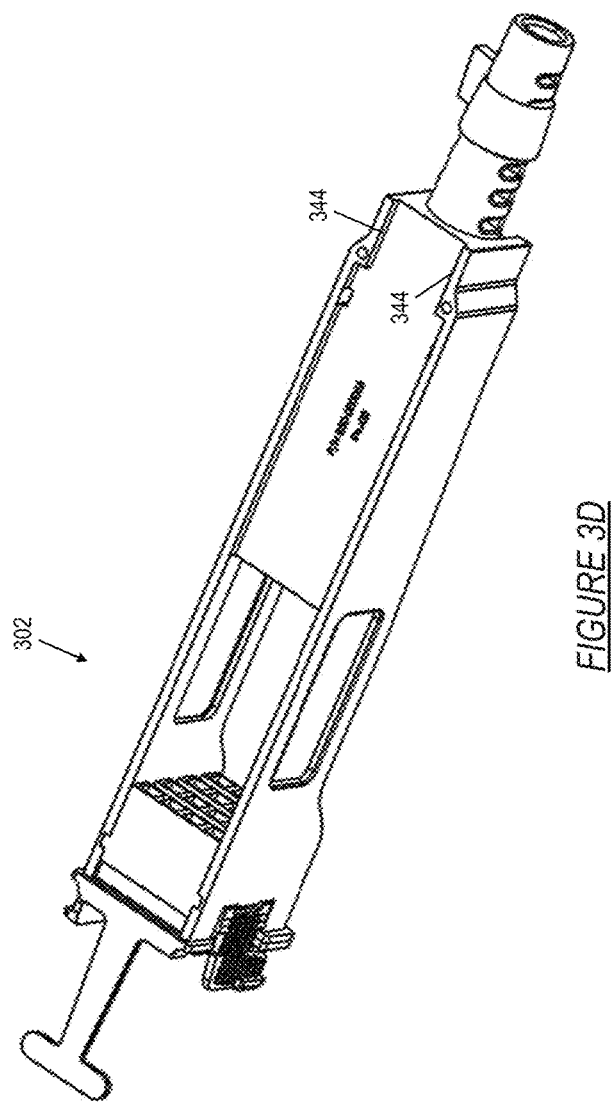

Turning to FIG. 3D, a bottom view of the module (302) is illustrated. The rear end (314) includes the edges (344) that laterally secure the rear end (314) of the module (302) to the panel (300).

Figure 3E:
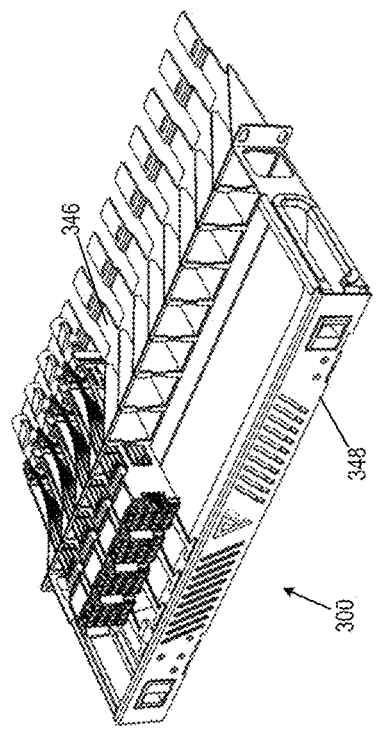

Turning to FIG. 3E, a view of the panel (300) is shown with four of the modules (302) inserted. The panel extensions (346) fit to the edges (344) (of FIG. 3D) of the modules (302). The door (348) is removably attached to the panel (300) to provide access to the modules (302).

Figure 3G:
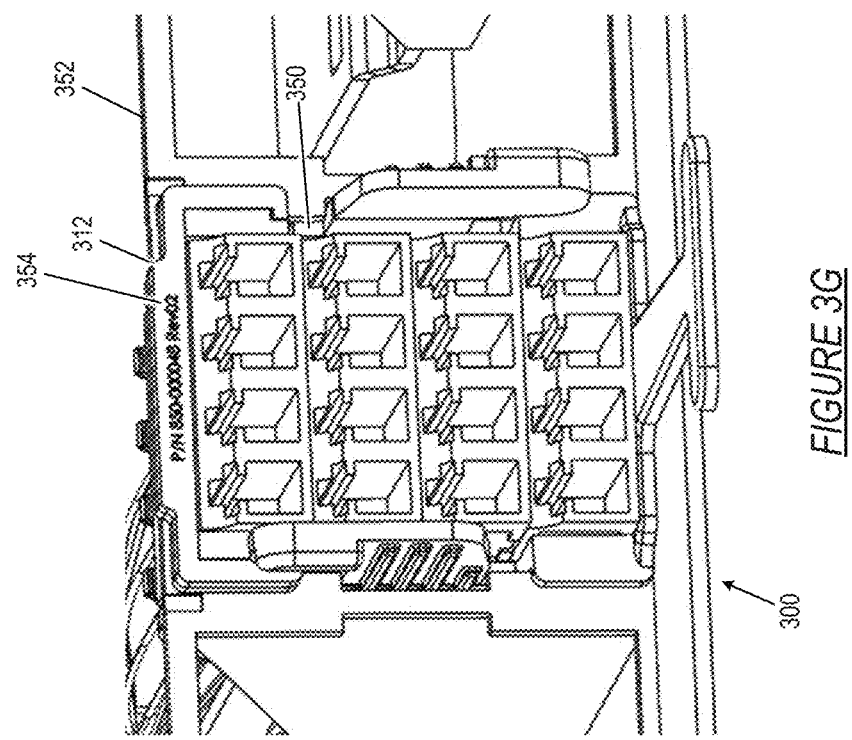
Figure 3F:
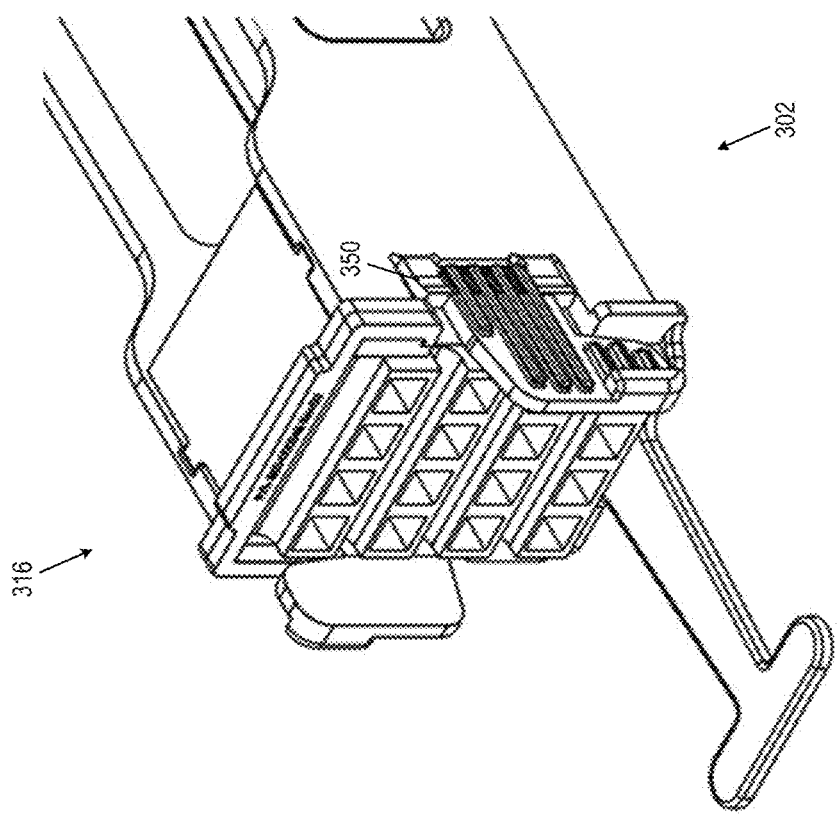

Turning to FIG. 3F, a view of the front end (316) is illustrated. The tab (326) includes the securing member (350). The securing member (350) secures the module (302) to the panel (300) to inhibit longitudinal motion of the module (302) with respect to the panel (300).

Turning to FIG. 3G, a view of the panel (300) with one of the modules (302) installed is illustrated. The securing member (350) fits to (e.g., snaps behind) the faceplate (352) to secure the module (302) to the panel (300). The retainer clip (312) includes the label (354).

In one embodiment, the label (354) is formed into the retainer clip (312) (e.g., embossed). In one embodiment, the label (354) is a sticker attached to the retainer clip (312). The label (354) identifies a part number of the module (302).

Figure 3H:
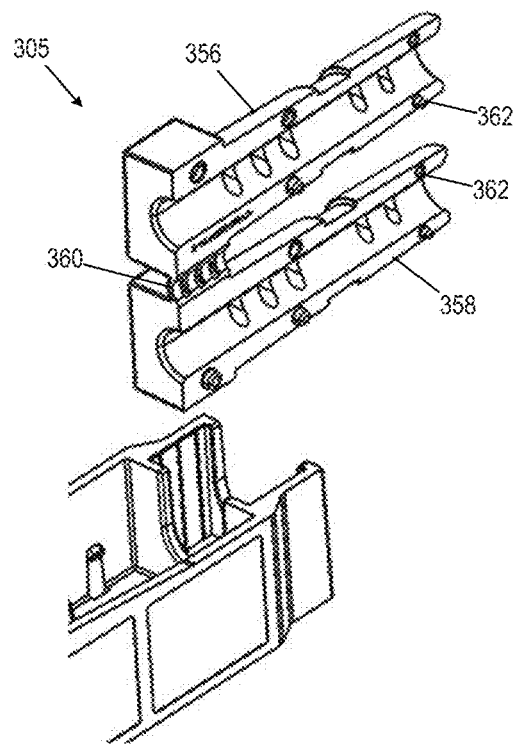

Turning to FIG. 3H a view of the strain relief (305) prior to being folded is illustrated. The strain relief (305) includes a first portion (356) and a second portion (358) connected by the hinge (360). In one embodiment, the hinge (360) is made of foldable plastic.

The hinge (305) includes the securing members (362) (e.g., integrally formed pegs and holes). The securing members inhibit the hinge (305) from opening after being closed.

Figure 3I:
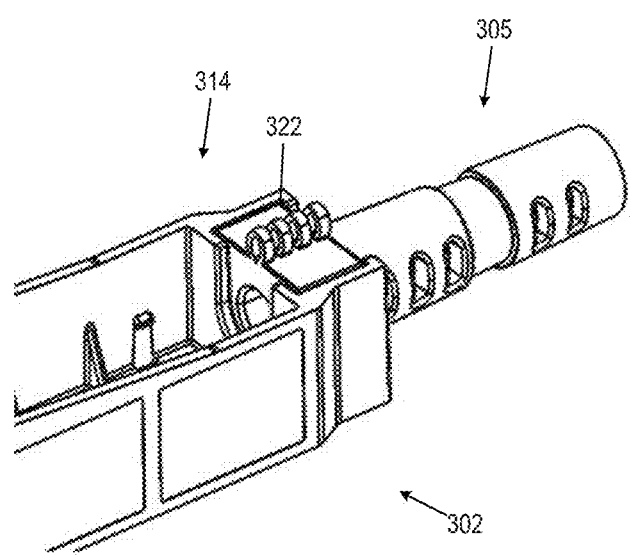

Turning to FIG. 3I, a further view illustrates the strain relief (305) after being folded. After being folded, the strain relief (305) is inserted into the relief receptor (322) of the rear end (314) of the module (302).

Figure 4A:
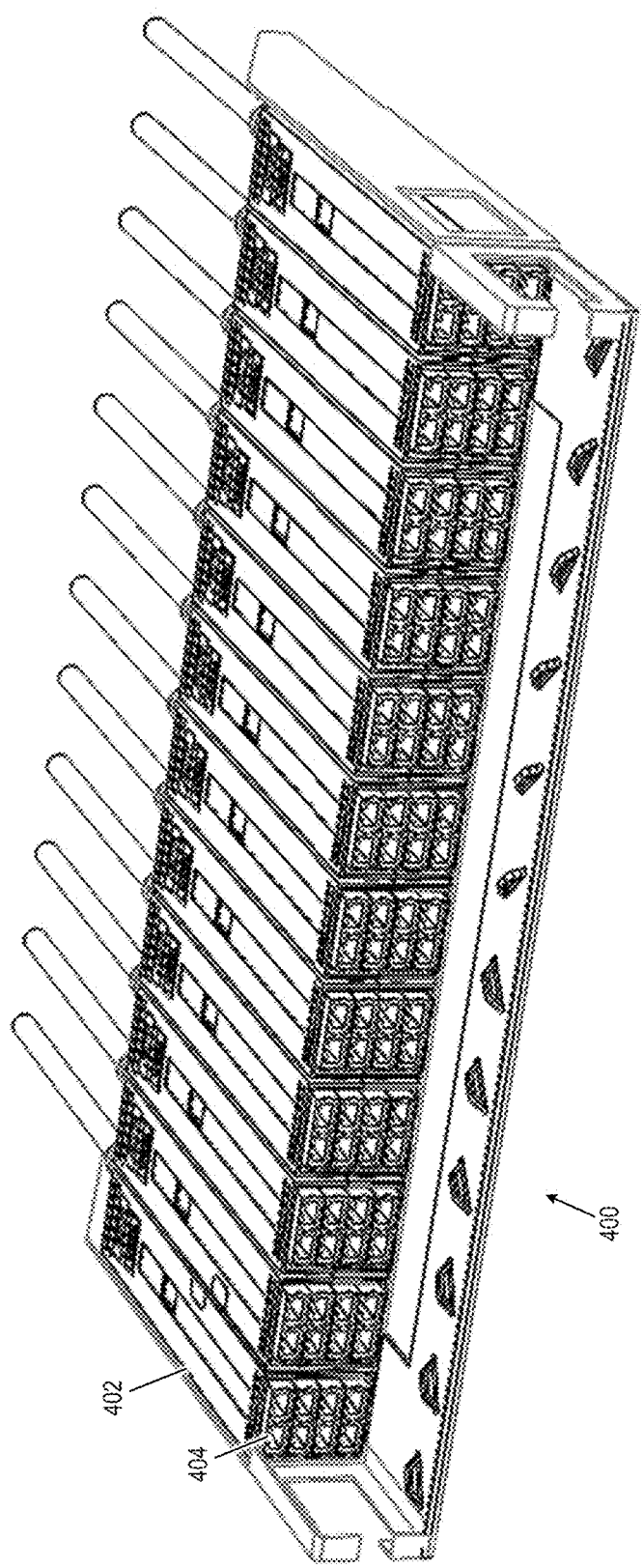

FIGS. 4A through 4G show the panel (400) with the modules (402). Turning to FIG. 4A, the panel (400) includes the modules (402). The modules (402) are rear loading modules. The panel (400) may have a height of 1 U of about 1.175 inches (44.45 millimeters). The modules (402) include the connector clusters (404). The connector cluster (404) includes 8 couplers (four pairs of bi couplers), which are MPO couplers. The couplers forming the connector cluster (404) may be integrally formed or adhered together.

The panel (400) includes 12 of the modules with a total of 96 MPO couplers. Each MPO coupler may have 36 ports for fibers and the panel (400) may provide for up to 3,456 fibers for a 19-inch rack. Additional modules, couplers, and fibers may be included in panels for larger racks. For example, a panel for a 23-inch rack may include space for 14 modules, 112 couplers, and 4,032 fibers.

Figure 4B:
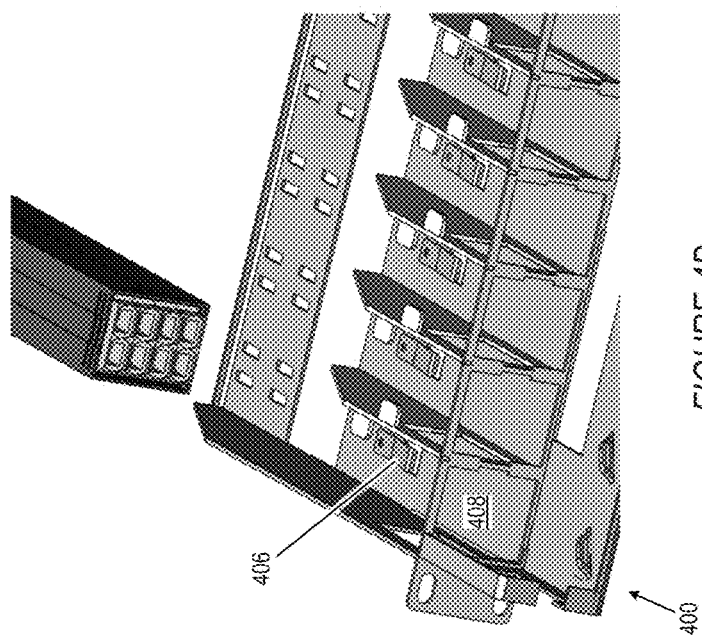

Turning to FIG. 4B, the panel (400) is illustrated prior to insertion of the module (402). The spring clip (406) is in the slot (408) for the module (402).

Figure 4C:
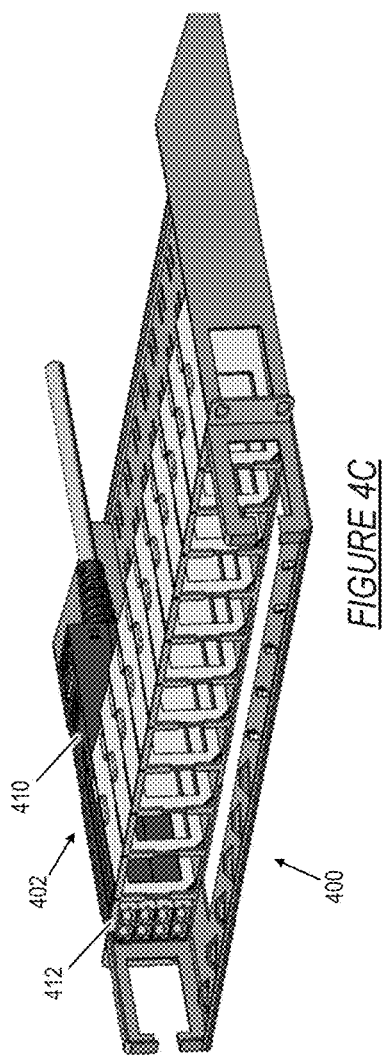

Turning to FIG. 4C, the panel (400) is illustrated after insertion of the module (402). The housing (410) of the module (402) may slide into the slot (408) (of FIG. 4B) up to and behind the faceplate (412).

Figure 4D:
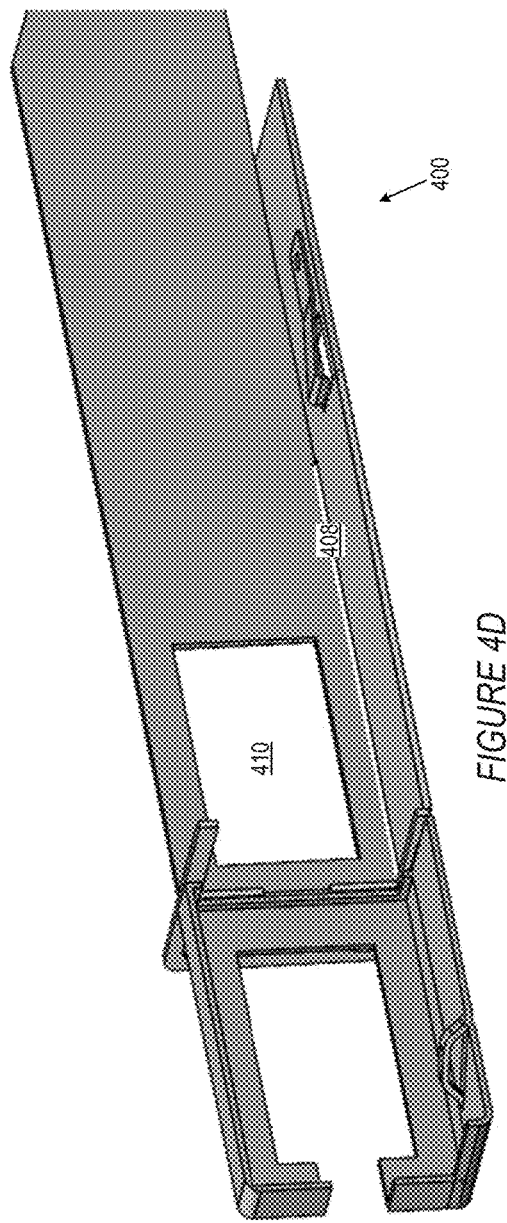

Turning to FIG. 4D, a cutaway view of the panel (400) is illustrated showing half of the slot (408) prior to insertion of the module (402) (of FIG. 4C). The slot (408) includes the spring clip (406). The opening (410) provides access to the module (402) (of FIG. 4C) after insertion of the module (402).

Figure 4E:
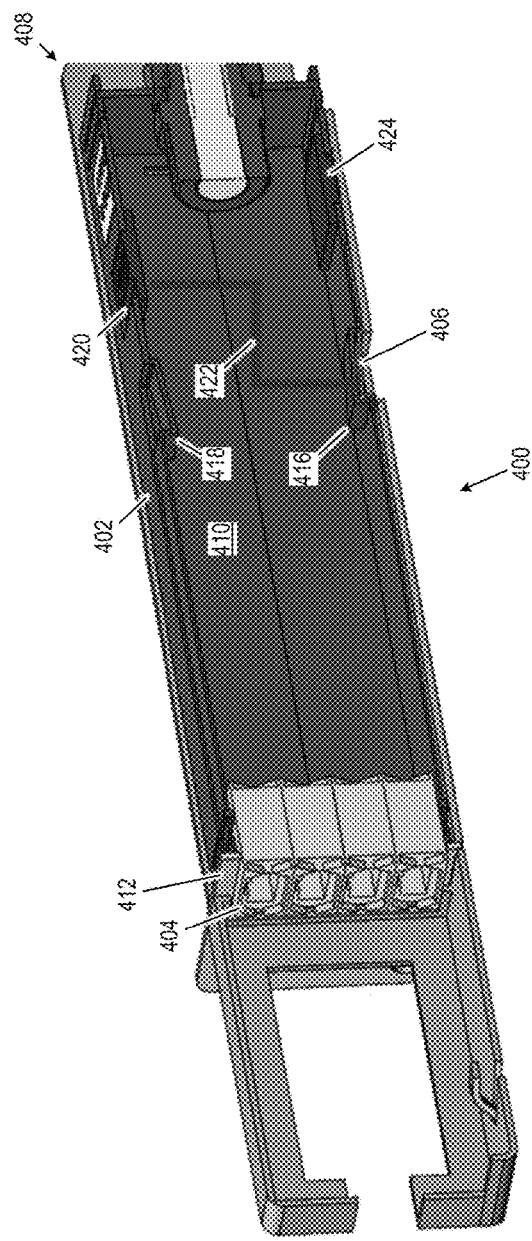

Turning to FIG. 4E, a cutaway view of the panel (400) and the module (402) is illustrated. The housing (410) of the module (402) includes the recesses (416) and (418). The MPO couplers of the connector cluster (404) may extend through the faceplate (412) of the panel (400).

With the module (402) inserted into the slot (408), the recess (416) receives the spring clip (406). The recess (416) with the spring clip (406) engage to lock the module (402) into place within the panel (400). The recess (418) allows for upside down insertion of the module (402) into the slot (408) of the panel (400).

The button (420) allows for the release of the module (402) from being locked into the slot (408) of the panel (400). The button (420) connects to the spring clip (406) with the mechanical member (422) that transfers force from the button (420) to the spring clip (406). The spring clip (406), through the mechanical member (422), may bias the button (420) to a locked position. The button (420) is configured to mechanically connect to the spring clip (406) and release the module (402) from the panel (400) by applying a force to the spring clip (406).

The recess (416) may include a hole through which the mechanical member (422) may contact the spring clip (406). The button (424) may also include a mechanical member (not shown) to release the module (402) when the spring clip engages with the recess (418).

Figure 4G:
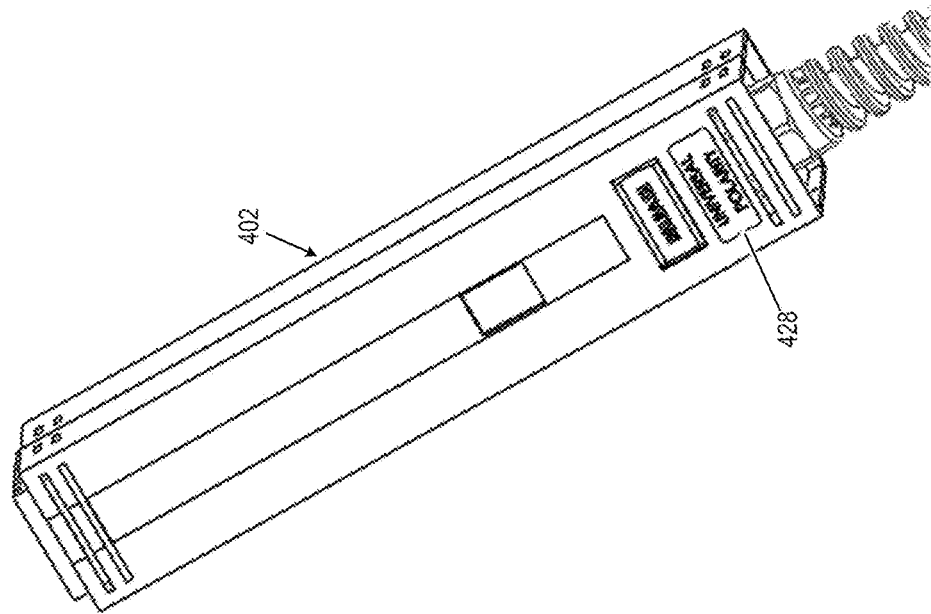
Figure 4F:
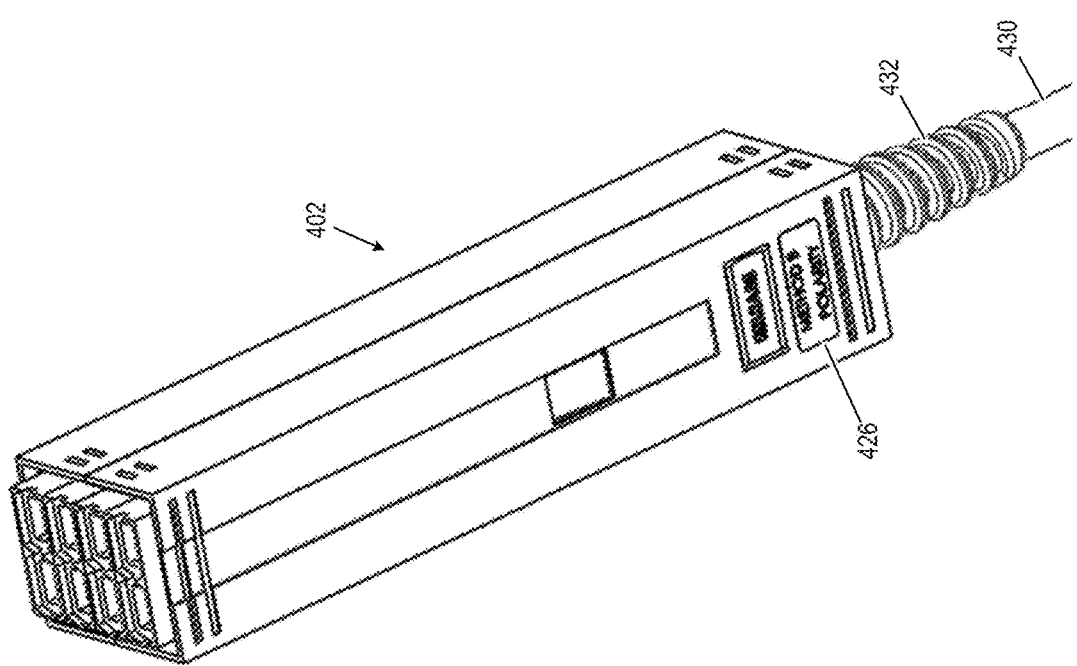

Turning to FIG. 4F a bottom view of the module (402) is illustrated. The label (426) identifies the polarity of the module (402) for when the module (402) is inserted upside down (e.g., method B polarity). The module (402) has a reversible polarity based on an orientation of the module (402) with respect to the panel (400) (of FIG. 4A). The polarity of the module (402) may be reversed by removing the module (402), flipping the module (402) over, and reinserting the flipped over module (402) into the panel (400). The trunk cable (430) is inserted through the strain relief (432) into the module (402). The strain relief (432) includes a coil wrapped around the trunk cable (430) to inhibit movement of the trunk cable (430).

Turning to FIG. 4G a top view of the module (402) is illustrated. The label (428) identifies the polarity of the module (402) for when the module (402) is inserted right side up (e.g., universal polarity).

Figure 5B:
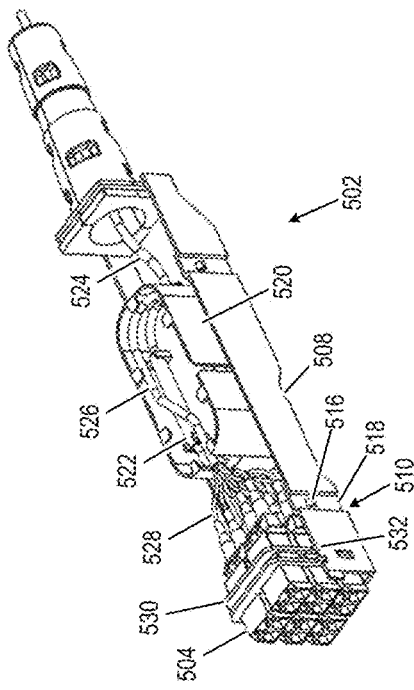
Figure 5D:
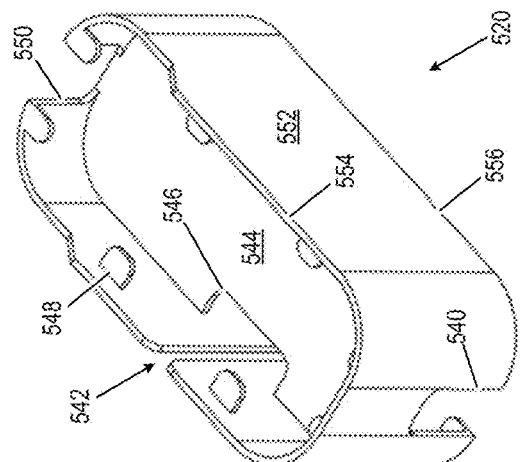
Figure 5A:
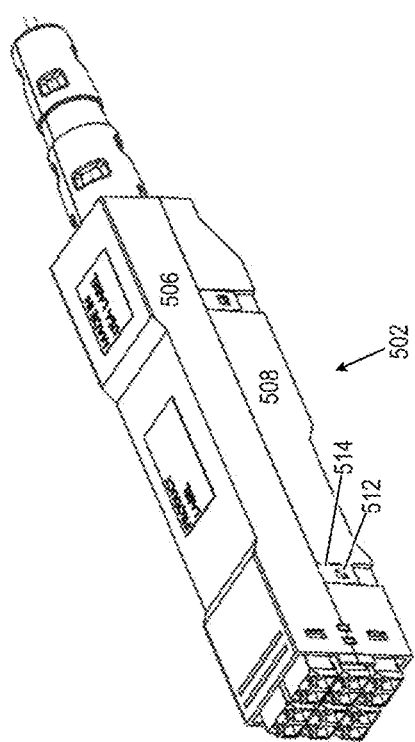

FIGS. 5A through 5F show views of the module (502). Turning to FIG. 5A, a view of the module (502) is illustrated. The module (502) includes the connector cluster (504) with eight LC couplers. Different couplers may be used. The module (502) includes the upper housing (506) and the lower housing (508). The upper housing (506) and the lower housing (508) may snap together with the connection members (510). The connection members (510) include the holes (512) of the tabs (514) of the upper housing (506) that fit to the notches (516) (see FIG. 5B) in the guides (518) of the lower housing (508).

Turning to FIG. 5B, a view of the module (502) without the upper housing (506) (of FIG. 5A) is illustrated. The connection members (510) include the notches (516) and the guides (518) of the lower housing (508) that fit to the holes (512) (of FIG. 5A) of the tabs (514) (of FIG. 5A) of the upper housing (506) (of FIG. 5A). The module (502) includes the slack housing (520). The slack housing (520) stores slack cable from before and after the splice (522). The slack cable before the splice (522) includes a portion of the trunk cable (524). The slack cable after the splice (522) includes the front cable (526), which includes the fibers (528) that are connected to the connector cluster (504). The slack housing (520) is shaped and configured to fit the module (502), which is a rear-loading module. The slack housing (520) may be used with front-loading or rear-loading modules.

The connector cluster (504) includes the cluster clip (530) shaped to receive the individual LC couplers. The connector cluster (504) is shaped to secure to the upper housing (506) (of FIG. 5A) and the lower housing (508) with the tabs (532).

Figure 5C:
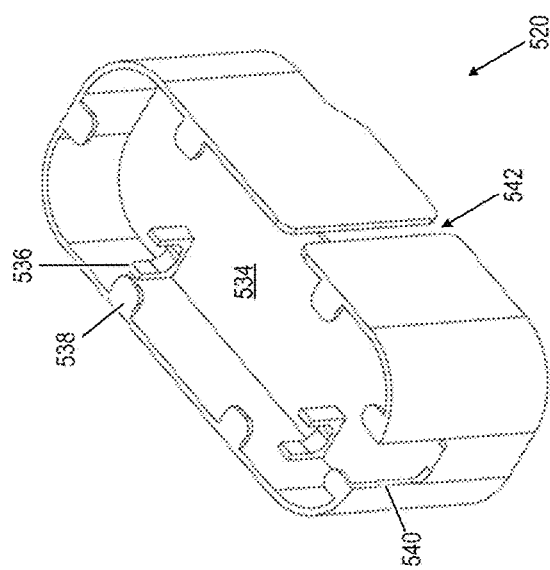

Turning to FIG. 5C, a top three-quarter view of the slack housing (520) is illustrated. The slack housing (520) includes the upper compartment (534) with the slot (542). The fiber slack length enabled by the slack housing allows the user to pull the fiber out of the module for operations, including splicing, and re-install the fiber and housing back into the module. The upper compartment (534) houses the splice (522) (of FIG. 5B) and the front cable (526) (of FIG. 5B). The slot (542) allows for inserting the trunk cable into the lower compartment (544) (of FIG. 5D).

The upper compartment (534) includes the splice clips (536), the upper tabs (538), and the upper hole (540). The splice clips (536) fit to the splice (522) (of FIG. 5B) to inhibit the splice (522) from moving within the upper compartment (534). The upper tabs (538) inhibit the movement of the front cable (526) (of FIG. 5B) out of the upper compartment (534). The upper hole (540) allows for the exit of the front cable (526) from the slack housing (520).

Turning to FIG. 5D, a bottom three-quarter view of the slack housing (520) is illustrated. The slack housing (520) includes the lower compartment (544) with the slot (542) and the opening (546). The opening (546) provides access between the upper compartment (534) (of FIG. 5C) and the lower compartment (544). The slot (542) may be used during installation of the cables (524) and (526) to place the cables (524) and (526) in the upper and lower compartments (534) and (544).

The lower compartment (544) includes the lower tabs (548) and lower hole (550). The lower tabs (548) inhibit movement of the trunk cable (524) (of FIG. 5B) within the lower compartment (544). The lower hole (550) allows for the entrance of the trunk cable (of FIG. 5B) into the lower compartment (544) of the slack housing (520).

The wall (552) of the slack housing (520) surrounds the slack housing (520). The lower edge (554) of the wall (552) connects to the upper edge (556) of the wall (552) through the slot (542). The lower edge (554) includes the lower hole (550). The upper edge (556) includes the upper hole (540).

Figure 5E:
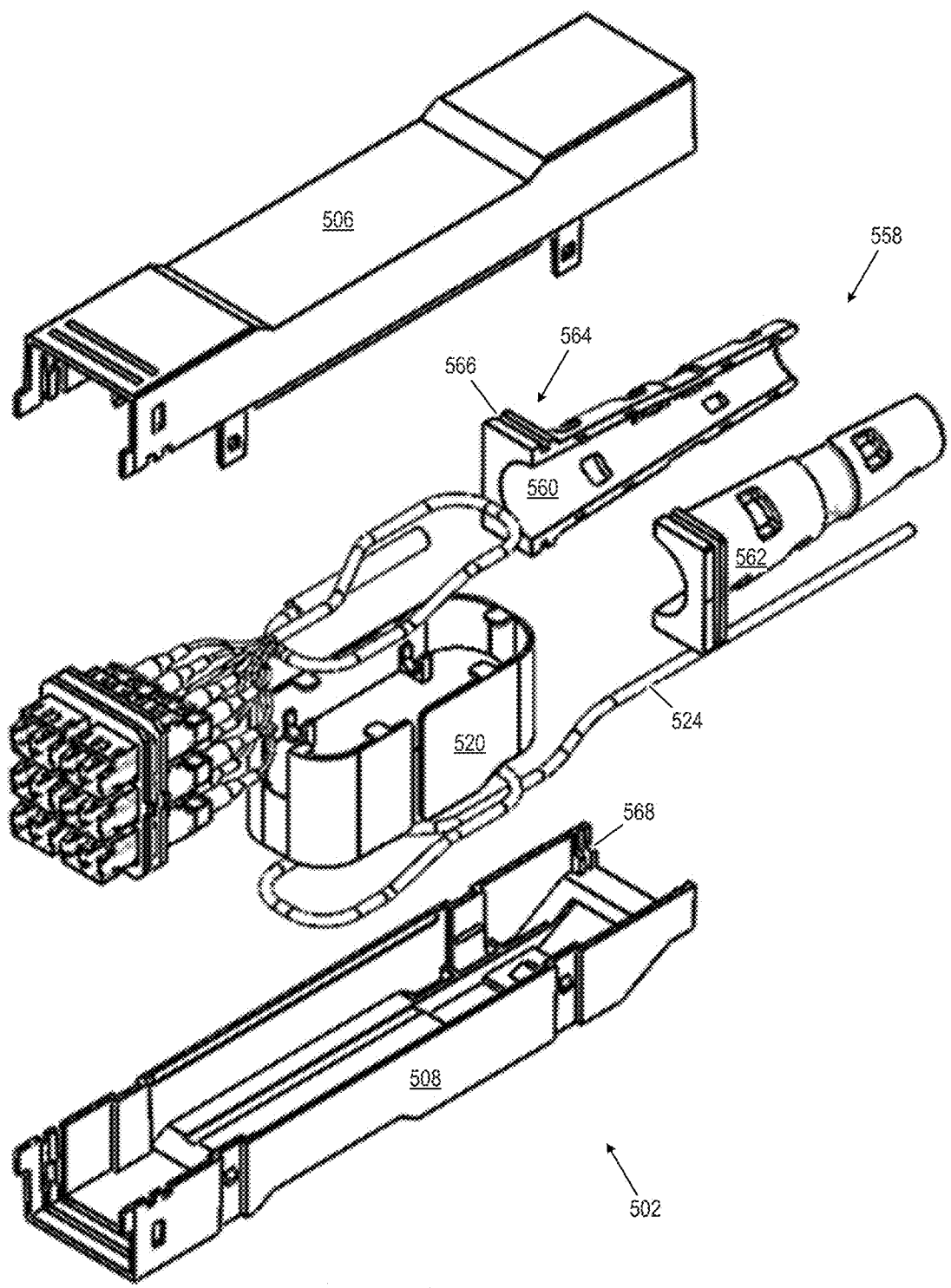

Turning to FIG. 5E, an exploded top three-quarter view of the module (502) is illustrated. The module (502) includes the upper housing (506) that snaps to the lower housing (508) to enclose the slack housing (520).

The strain relief (558) includes the two portions (560) and (562). A portion of the trunk cable (524) fits within the two portions (560) and (562) of the strain relief (558). The head (564) includes the features (566) that match to the features (568) of the lower housing to secure the strain relief (558) to the module (502).

Figure 5F:
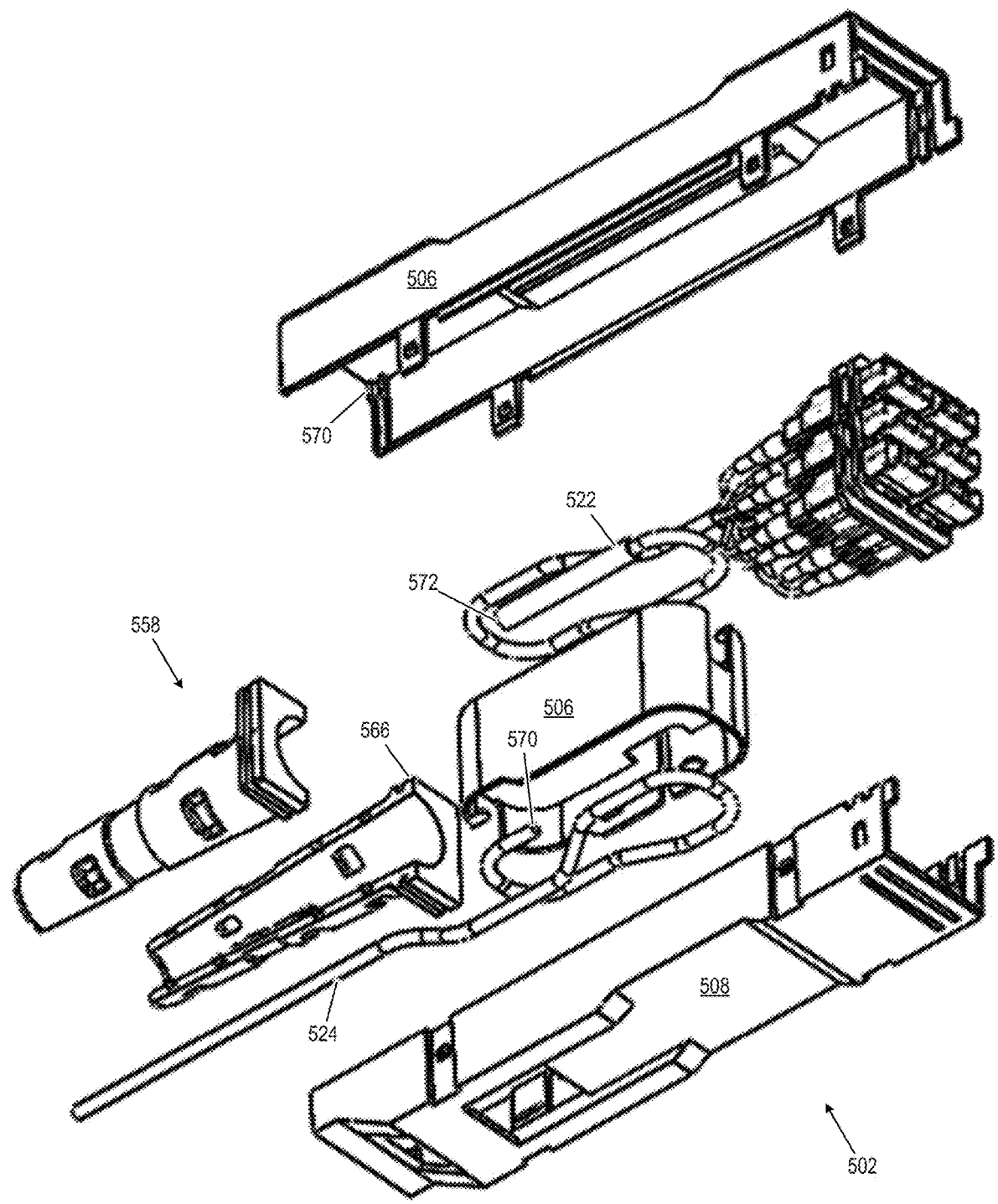

Turning to FIG. 5F, an exploded bottom three-quarter view of the module (502) is illustrated. The upper housing (506) includes the features (570) that match to the features (566) of the strain relief (558) and secure the strain relief (558) to the module (502).

The trunk cable (524) includes the end (570). When assembled, the end (570) of the trunk cable (524) is connected to the end (572) of the splice (522).

Figure 6A:
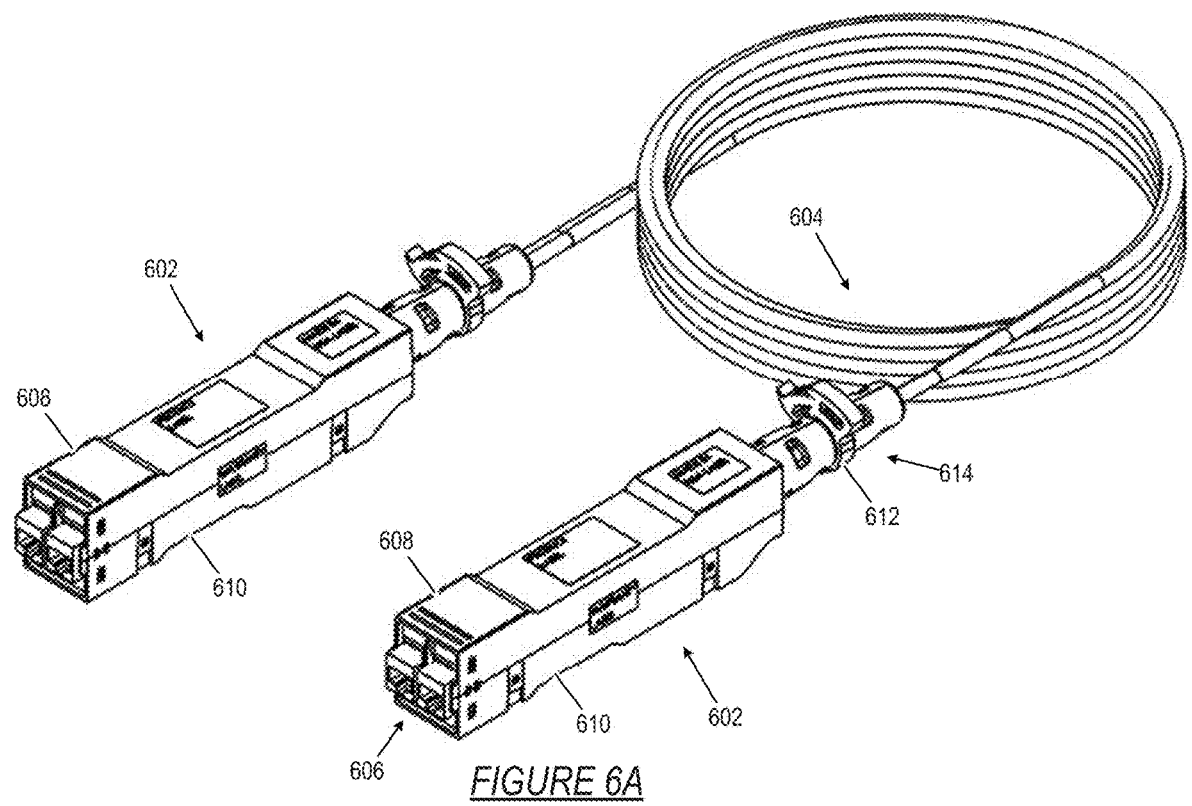

FIGS. 6A through 6D show views of the modules (602). Turning to FIG. 6A, the modules (602) are connected by the trunk cable (604). The trunk cable (604) includes two electrical cables, which may be ethernet cables. The modules (602) include the connector clusters (606), upper housings (608), and lower housings (610). The clip (612) secures the strain relief (614).

Figure 6B:
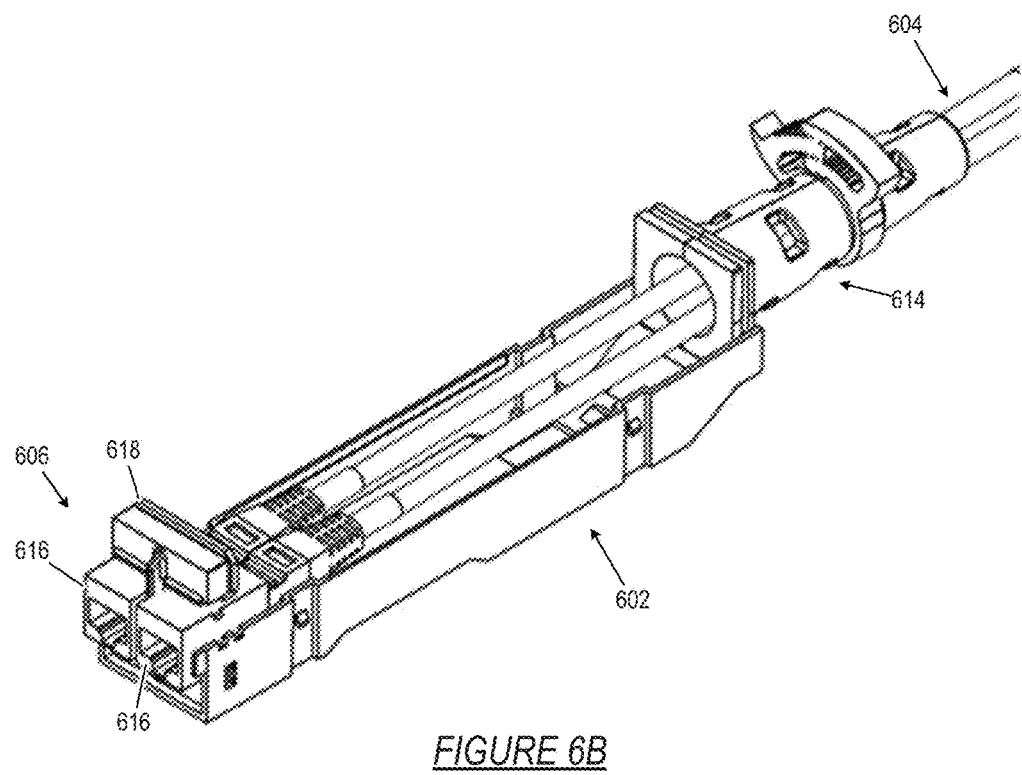

Turning to FIG. 6B, a view of the module (602) without the upper housing (608) (of FIG. 6A). The connector cluster (606) includes the two couplers (616), which may be ethernet couplers. Each of the couplers (616) includes two female ports. Different configurations of couplers may be used. The trunk cable (604) extends through the strain relief (614) and the module (602) to connect with the connector cluster (606). The couplers (616) may be integrally formed with each other.

The connector cluster (606) includes the brace (618). The brace (618) is shaped to fit securely within the module (602). In one embodiment, the connector cluster (606) may be modified to handle the two electrical couplers (616) along one or more optical fiber couplers.

Figure 6C:
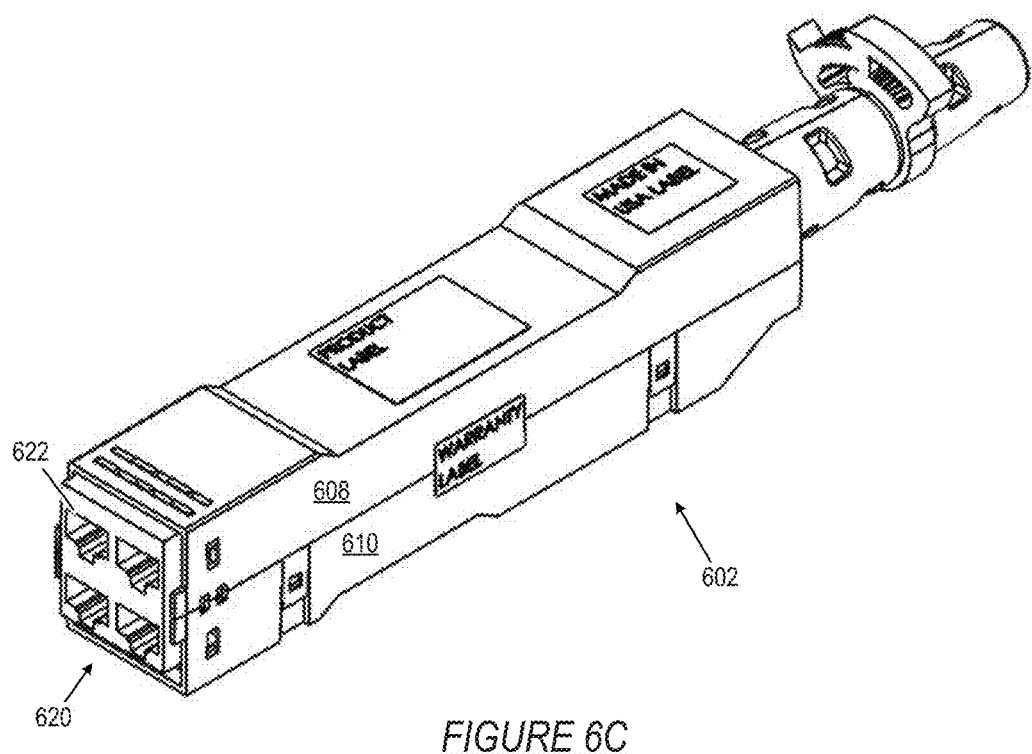

Turning to FIG. 6C, the module (602) is modified and includes the connector cluster (620). The module (602) includes the upper housing (608) and the lower housing (610). The connector cluster (620) provides the four couplers (622). In one embodiment, the four couplers are ethernet couplers. In one embodiment, the module (602) may be one of twelve modules fit to a panel of a 19-inch rack. The panel may have a 1 U height and provide 48 total couplers. Additional modules, couplers, and ethernet cables may be included in panels for larger racks. For example, a panel for a 23-inch rack may include space for 14 modules and 56 couplers.

Figure 6D:
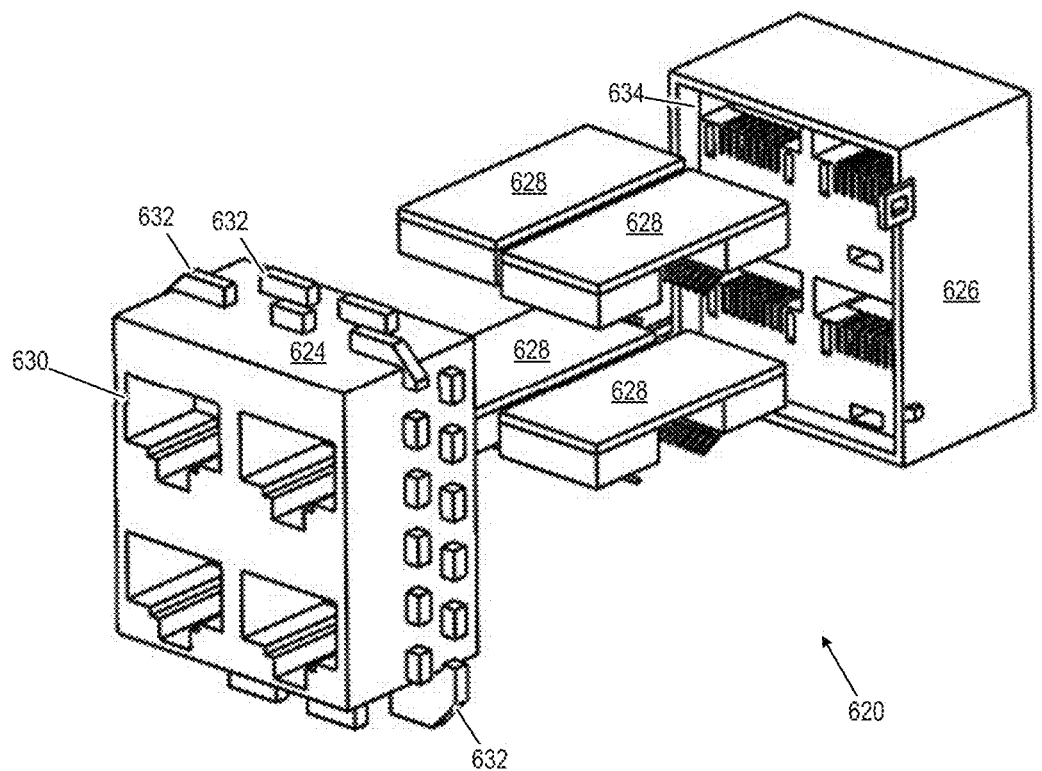

Turning to FIG. 6D, an exploded view of the connector cluster (620) is illustrated. The connector cluster (620) includes the front receptacle (624), the rear receptacle (626), and the boards (628).

The front receptacle (624) includes the openings (630) configured to receive the boards (628) from an inner side and the connectors of cables from an outer side. The front receptacle (624) includes the features (632) that are shaped to fit to and match with the upper housing (608) and the lower housing (of FIG. 6C).

The rear receptacle (626) includes the openings (634) configured to receive the boards (628) from an inner side and the connectors from the trunk cable (604) (of FIG. 6A) from an outer side.

The boards (628) are fixed to both the front receptacle (624) and the rear receptacle (626). The boards (628) pass electrical signals from the trunk cable (604) (of FIG. 6A) to other cables connected to the front of the module (602) (of FIG. 6C).

Figure 7:
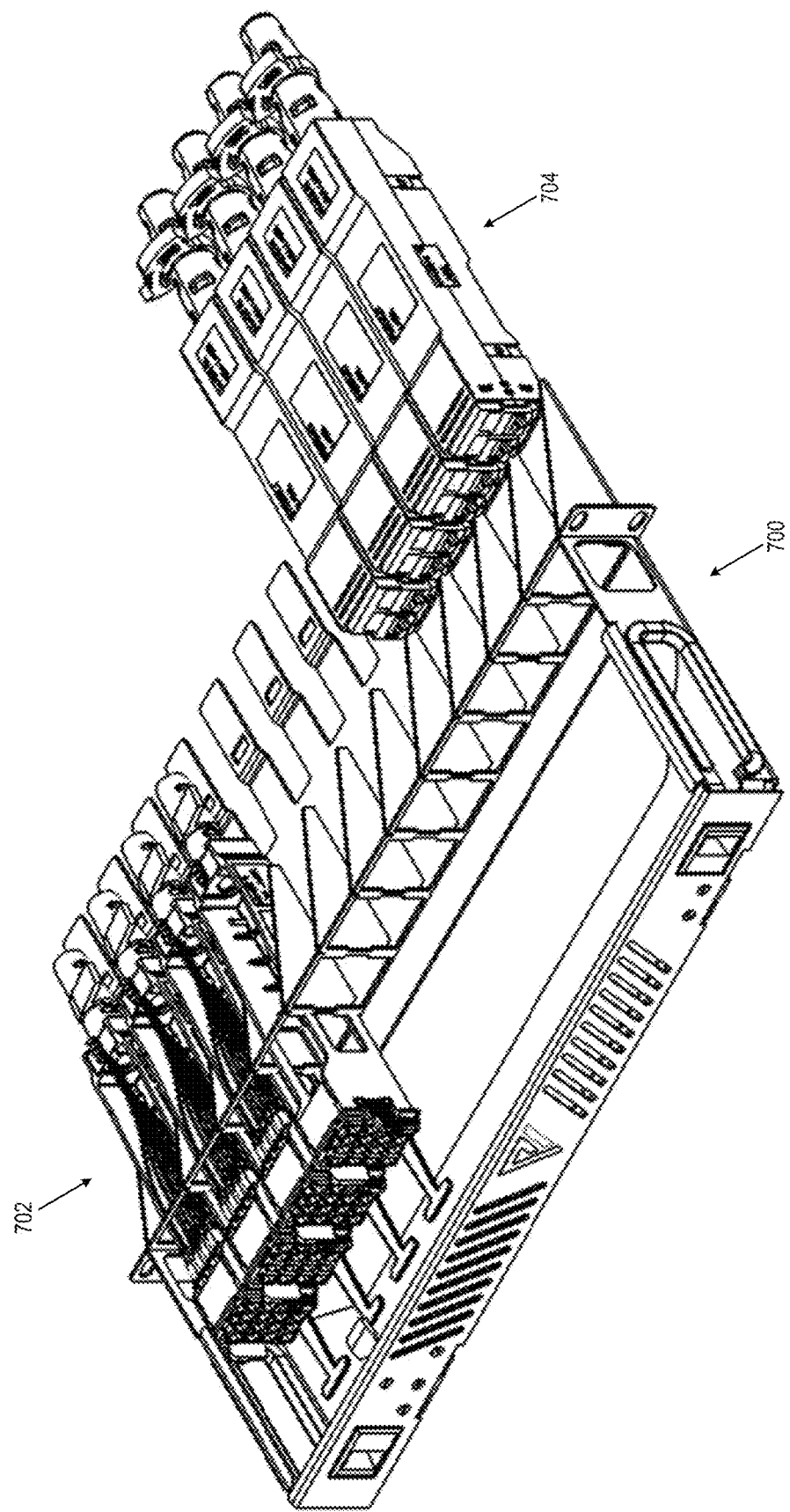

Turning to FIG. 7, a view of the panel (700) is illustrated. The panel (700) may be used for both optical and electrical cables. The panel (700) includes the modules (702) and the modules (704). The modules (702) are front-loading modules and house optical cables. The modules (704) are rear-loading modules and house electrical cables.

Figure 8A:
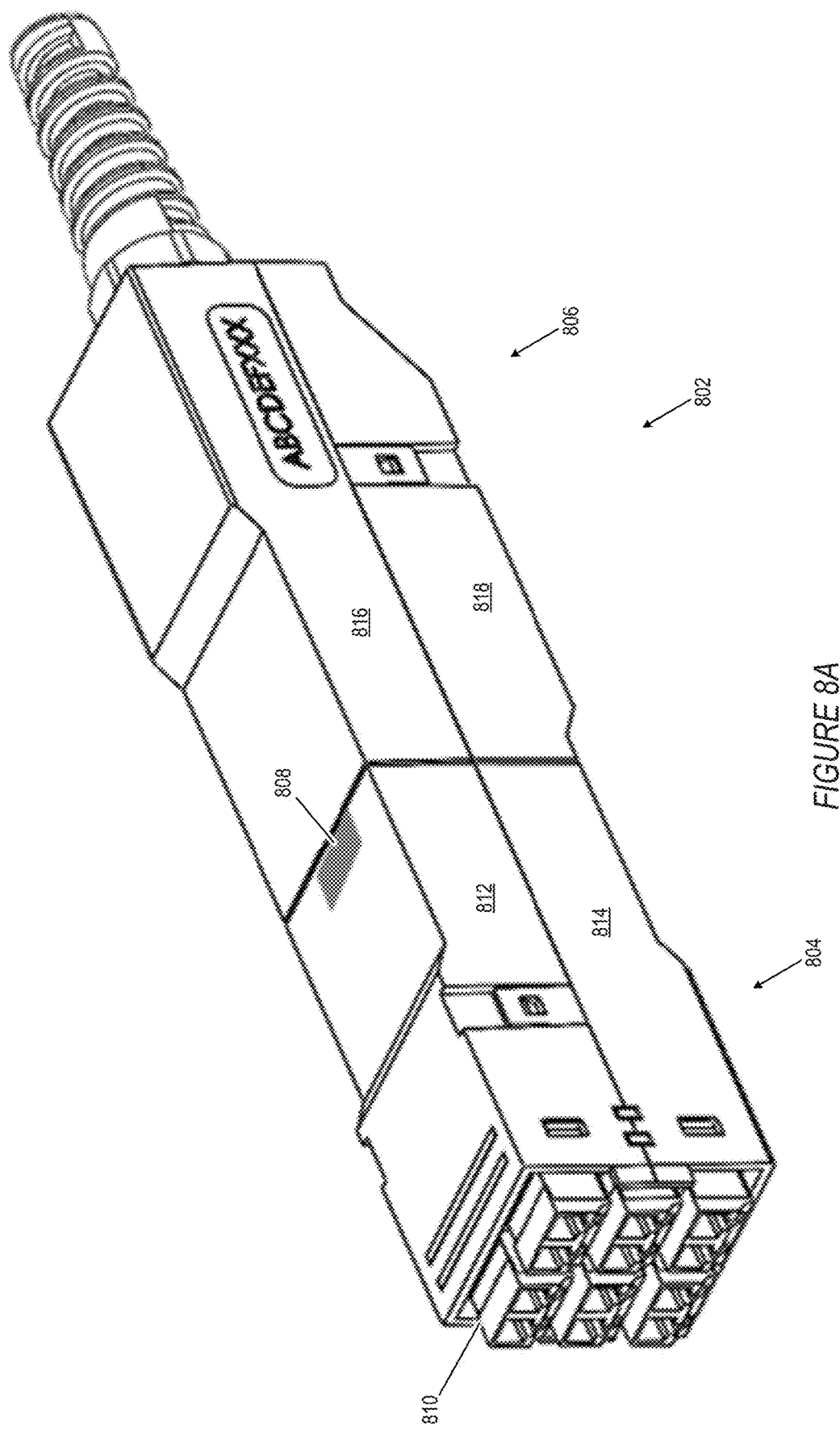
Figure 8B:
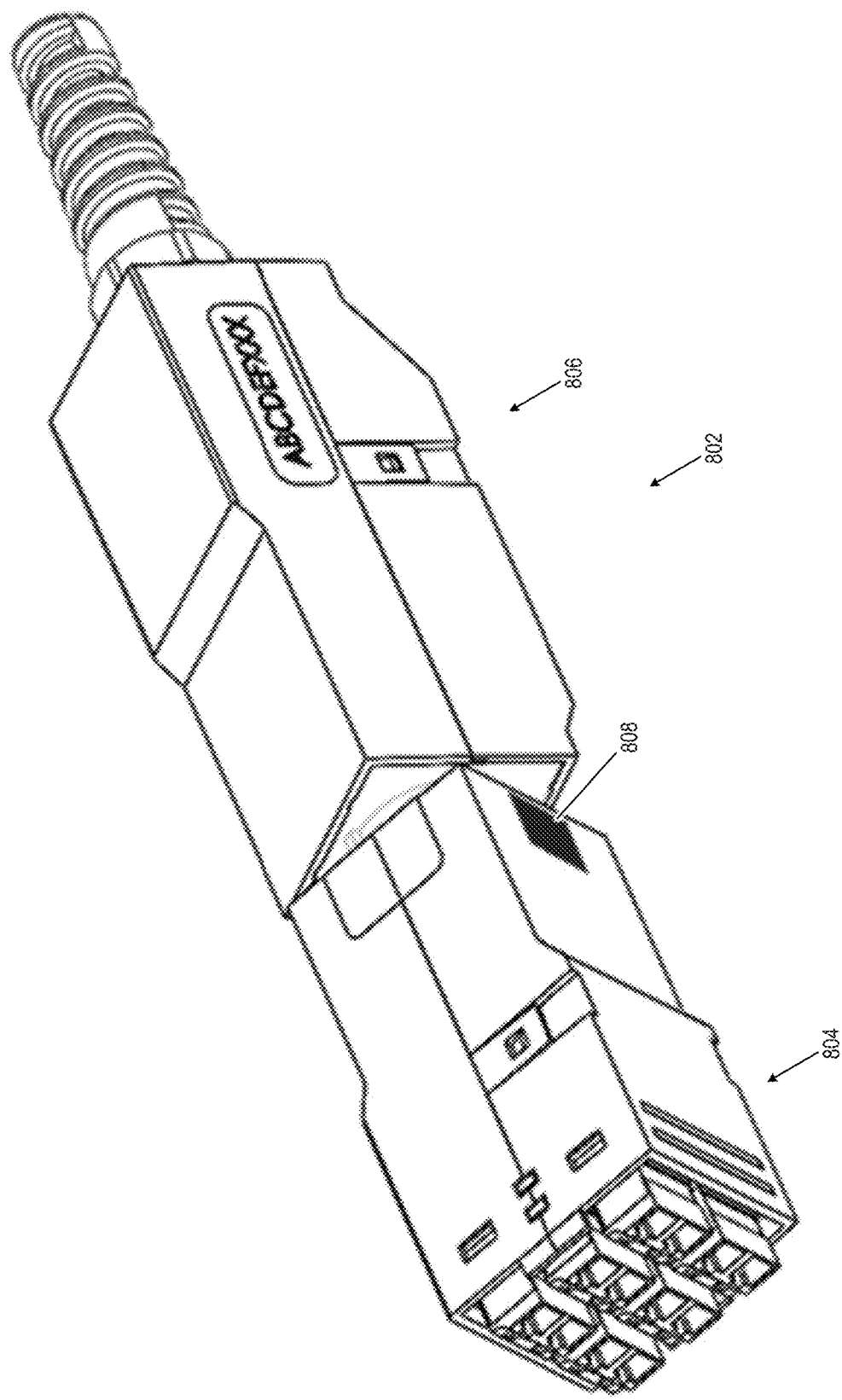
Figure 8C:
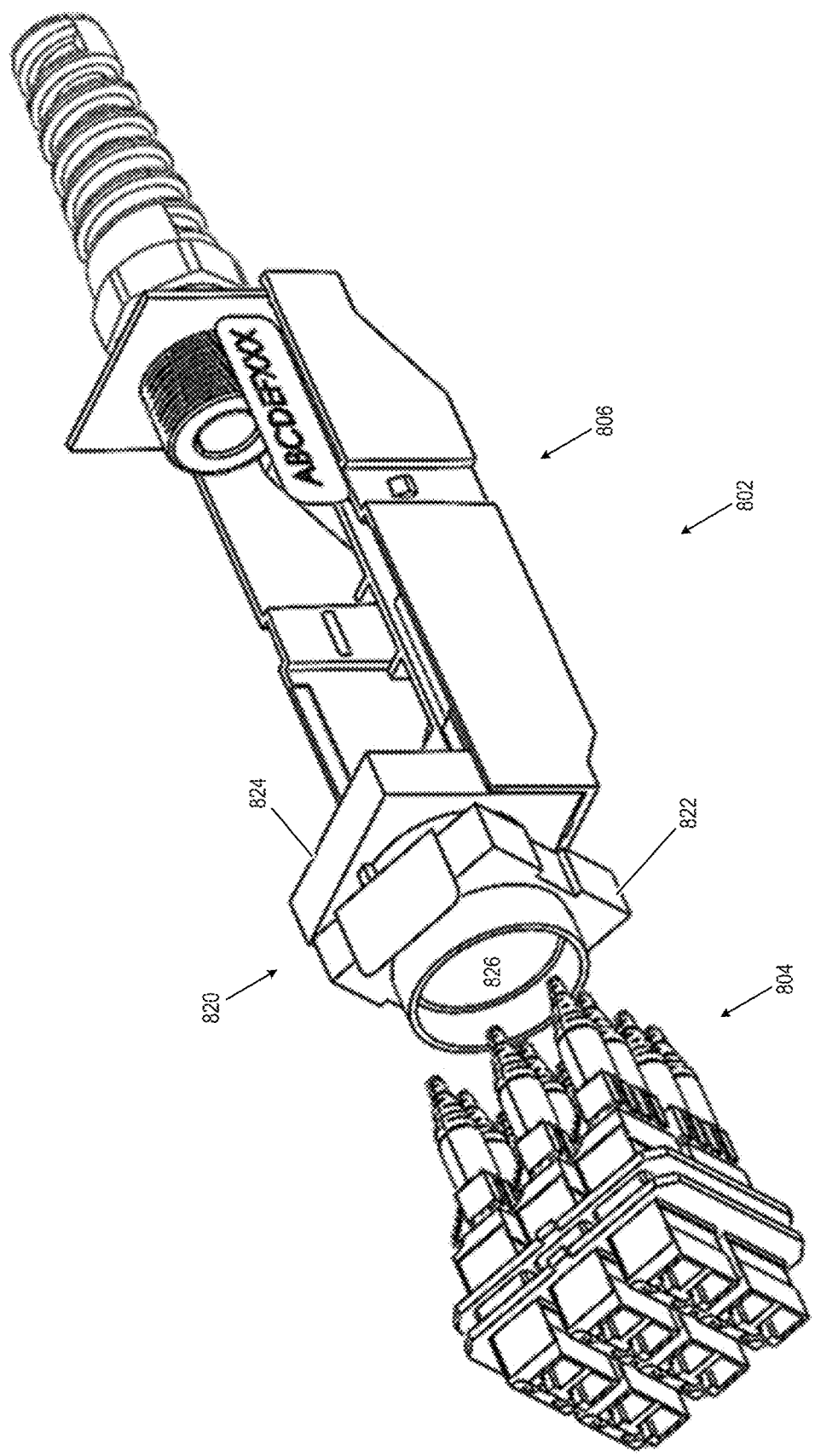

FIGS. 8A through 8C show views of the modules (802). Turning to FIG. 8A, the module (802) provides for changing a polarity of the module (802). The polarity may be changed after the module (802) is assembled and filled with cabling. The module (802) includes the front end (804) and the rear end (806). The front end (804) includes the indicator (808) and is in a first alignment with respect to the trunk end (806). The connector cluster (810) includes twelve couplers. Different embodiments may have different numbers and types of couplers.

The front end (804) includes the upper housing (812) and the lower housing (814). The trunk end (806) includes the upper housing (816) and the lower housing (818).

Turning to FIG. 8B, the front end (804) of the module (802) is twisted from the first alignment towards a second alignment and the status on the indicator (808) is changed. The indicator (808) may show a first indication (e.g., color, text, patter, etc.) when the front end (804) is in a first alignment with the trunk end (806) (e.g., right side up) for a first polarity (e.g., universal polarity). The indicator (808) may show a second indication when the front end (804) is in a second alignment with the trunk end (806) (e.g., upside down) for a second polarity (e.g., method B polarity). In one embodiment, the indicator (808) may show another indication when the front end (804) is not aligned with the trunk end (806) in either the first alignment or the second alignment.

Turning to FIG. 8C an exposed view of the module (802) (without the upper housing (812), the lower housing (814), and the upper housing (816)) is illustrated. The module (802) includes the twist connector (820) between the front end (804) and the trunk end (806). Cable in the module (802) may be installed to extend through the hole (826) of the twist connector (820).

The twist connector (820) includes the front portion (822) and the trunk portion (824). The front portion (822) is shaped to secure to the upper and lower housings (812) and (814) (of FIG. 8A) of the front end (804). The trunk portion (824) is shaped to secure to the upper and lower housings (816) and (818) of the trunk end (806).

Figure 9A:
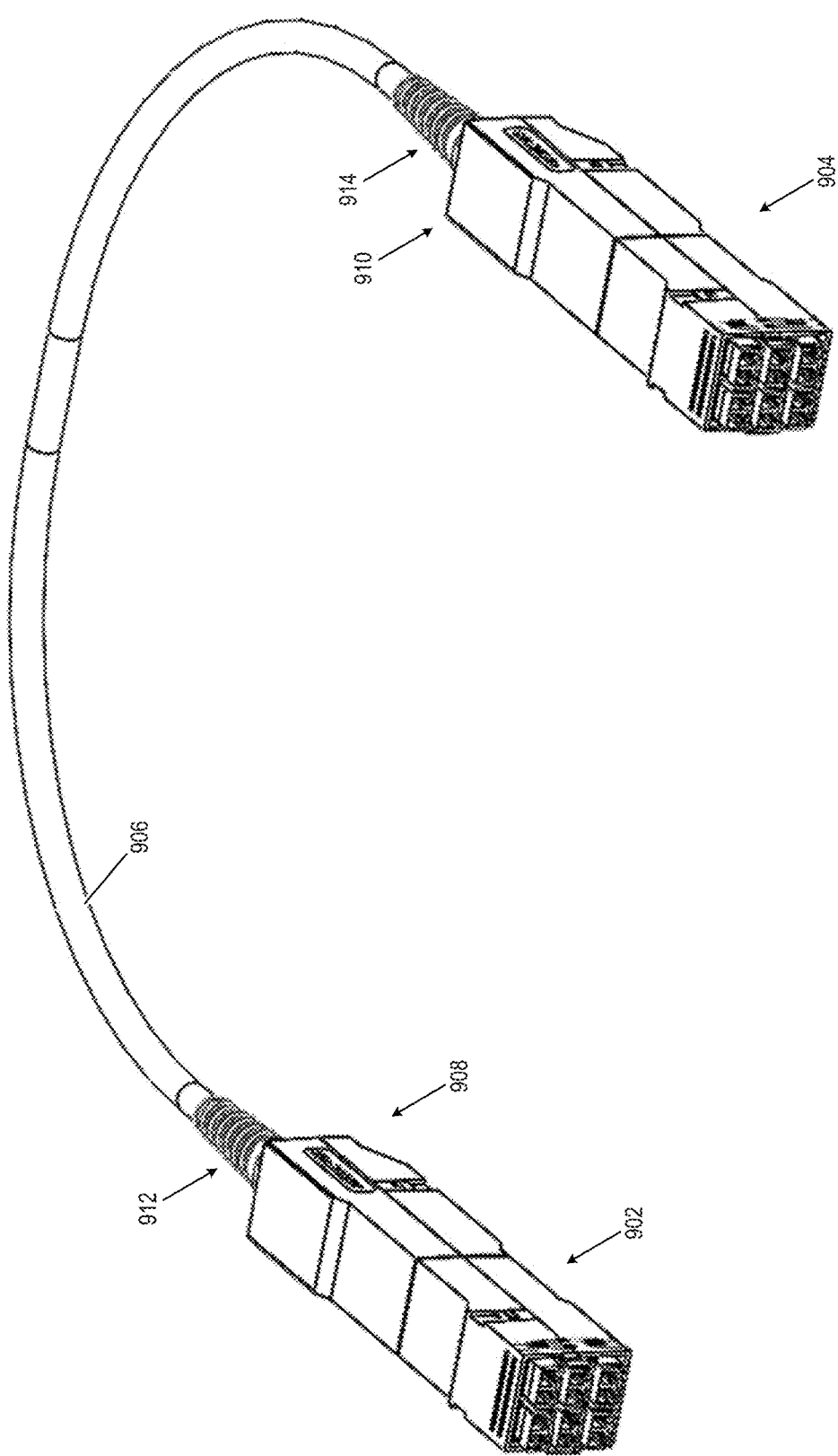
Figure 9B:
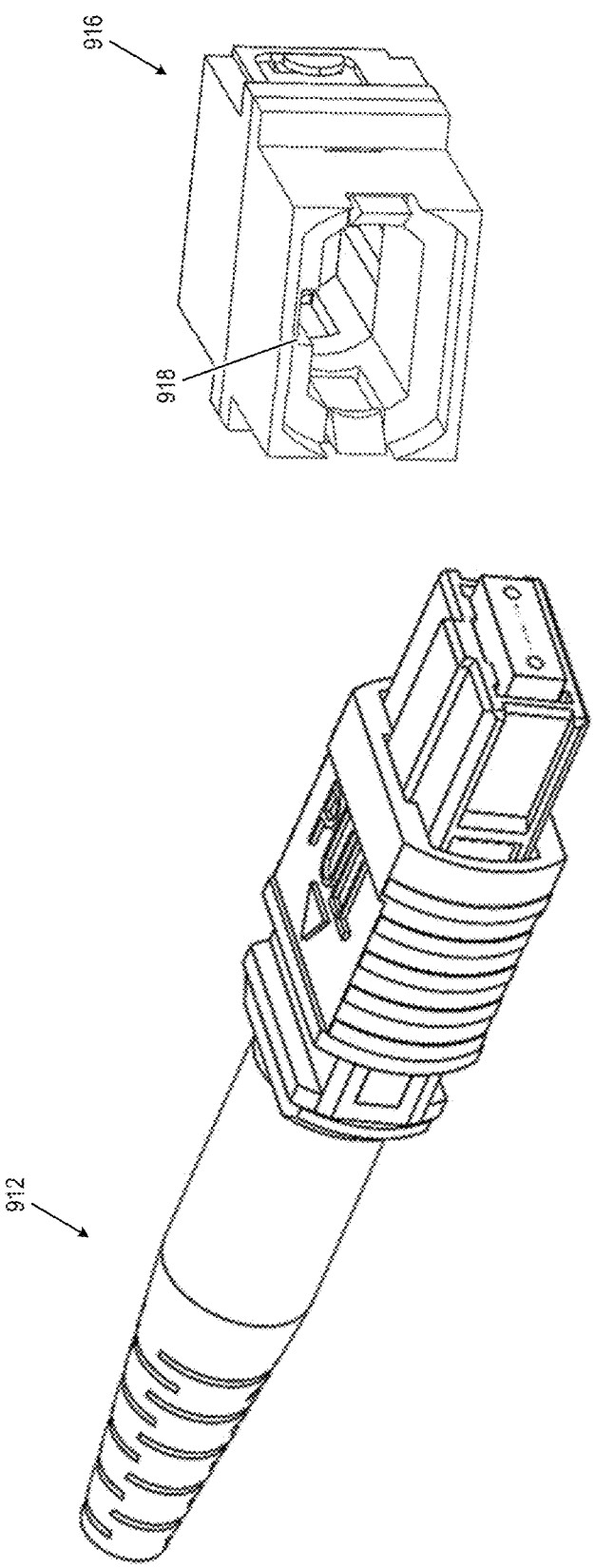
Figure 9C:
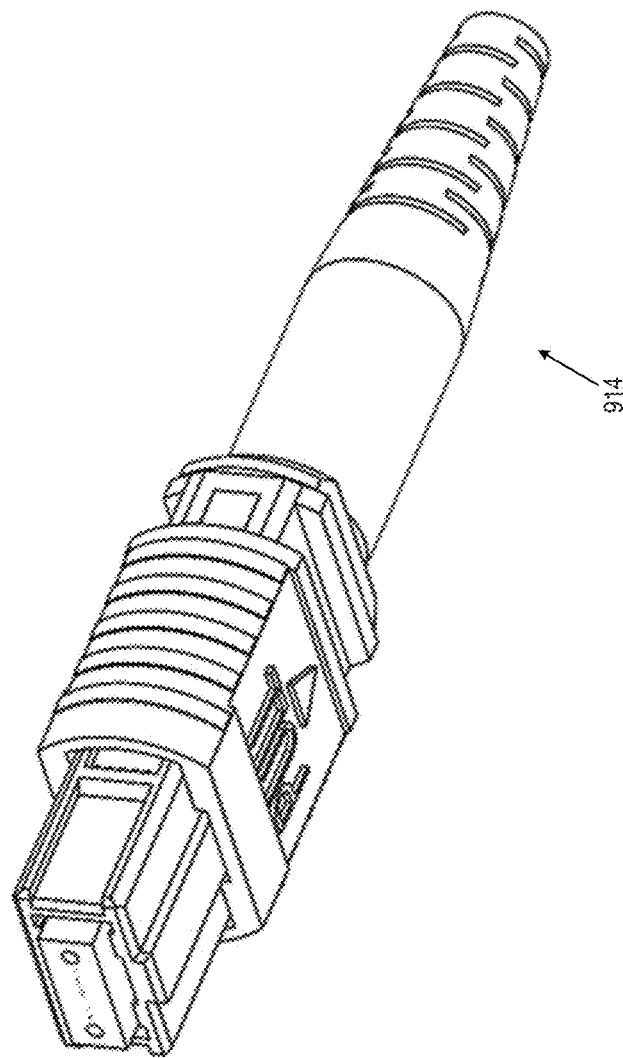
Figure 9C:
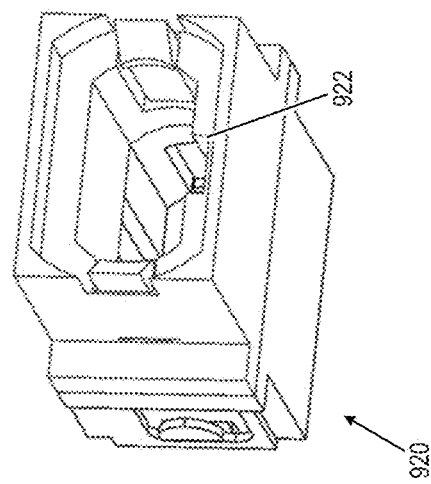

FIGS. 9A through 9C show views of the modules (902) and (904). Turning to FIG. 9A, the modules (902) and (904) connect with the cable (906). The cable (906) is a fiber optic cable that connects to the trunk end (908) of the module (902) with a first polarity and to the trunk end (910) of the module (904) with a second polarity. The cable (906) includes the connector (912) that connects to the module (902) and the connector (914) that connects to the module (904).

Turning to FIG. 9B, the connector (912) fits one way to the adapter (916) with the guide (918) turned upwards. The adapter (916) is reversibly fitted to the trunk end (908) (of FIG. 9A) of the module (902). The adapter (916) may be removed from, reversed, and refitted to the module (902). Reversing the adapter (916) reverses the polarity of the optical fibers of the module (902) (of FIG. 9A).

Turning to FIG. 9C, the connector (914) fits one way to the adapter (920) with the guide (922) turned downwards. The adapter (920) is reversibly fitted to the trunk end (910) (of FIG. 9A) of the module (904) (of FIG. 9A). The adapter (920) is installed to the module (904) (of FIG. 9A) with the opposite polarity of the adapter (916) (of FIG. 9B) of the module (902) (of FIG. 9A).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus comprising a module, the module comprising:
    a housing configured to load the module through a front end of a panel, the housing comprising:
        sides and a bottom that extend between a front end and a rear end of the housing;
        a set of inversely shaped guides recessed into the sides of the housing at the front end;
        a relief receptor positioned at the rear end of the module; and
        a set of tabs extending from the sides of the housing at the front end and corresponding to a set of securing members that secure the module to a faceplate of a panel;
    a connector cluster positioned at the front end of the housing and removably retained between the walls within the set of inversely shaped guides; and
    a strain relief insertable into the relief receptor at a rear end of the module and configured to be coupled to a trunk cable.

2. The apparatus of claim 1, further comprising:
    a panel, wherein:
    the module is configured to extend between a front end of the panel and a rear end of the panel; and
    the module is configured to be one of a set of at least ten modules horizontally juxtaposed within the panel.

3. The apparatus of claim 1, further comprising:
    a plurality of openings in the sides of the housing configured to provide access to cables within the module.

4. The apparatus of claim 1, wherein the strain relief further comprises:
    a first portion and a second portion connected by a hinge.

5. The apparatus of claim 1, wherein the connector cluster comprises a plurality of multi-fiber couplers for fiber optic cables that are stacked between the set of inversely shaped guides.

6. The apparatus of claim 1, wherein the connector cluster comprises a set of electrical couplers.

7. The apparatus of claim 1, wherein the connector cluster comprises sixteen LC couplers, within a 1 U height, of 192 couplers of the panel comprising a set of twelve modules including the module.

8. The apparatus of claim 1, wherein the connector cluster comprises eight MPO couplers, within a 1 U height, of 96 couplers of the panel comprising a set of twelve modules, including the module, providing 3456 fibers using the 96 couplers.

9. An apparatus comprising:
    a housing configured to load the module through a trunk end of a panel, the housing comprising:
        sides and a bottom that extend between a front end and a rear end of the housing;
        a set of inversely shaped guides recessed into the sides of the housing at the front end;
        a relief receptor positioned at the rear end of the module; and
        a connector cluster positioned at the front end of the housing and removably retained between the walls within the set of inversely shaped guides;
    a reversible polarity based on an orientation of the module with respect to the panel; and a strain relief insertable into the relief receptor at a rear end of the module and configured to be coupled to a trunk cable.

10. The apparatus of claim 9, further comprising:
the panel, wherein the panel comprises a spring clip; and
wherein the module further comprises a first recess configured to receive the spring clip of the panel to secure the module to the panel.

11. The apparatus of claim 9, further comprising:
the module configured to extend between a front end of the panel and a rear end of the panel; and
the module configured to be one of a set of at least ten modules horizontally juxtaposed within the panel.

12. The apparatus of claim 10, further comprising:
a second recess configured to receive the spring clip when the module is inserted to the panel with an opposite polarity compared to the first recess of the apparatus.

13. The apparatus of claim 10, further comprising:
a button configured to mechanically connect to the spring clip and release the module from the panel by applying a force to the spring clip.

14. The apparatus of claim 9, wherein the connector cluster comprises a plurality of multi-fiber couplers for fiber optic cables that are stacked between the set of inversely shaped guides.

15. The apparatus of claim 9, wherein the connector cluster comprises four ethernet couplers of 48 ethernet couplers in the panel, and wherein the panel comprises a 1 U height and is configured for a 19-inch rack.

16. The apparatus of claim 9, wherein the connector cluster comprises sixteen LC couplers, within a 1 U height, of 192 couplers of the panel comprising a set of twelve modules including the module.

17. The apparatus of claim 9, wherein the connector cluster comprises eight MPO couplers, within a 1 U height, of 96 couplers of the panel comprising a set of twelve modules, including the module, providing 3456 fibers using the 96 couplers.

18. A method comprising:
installing a trunk cable to a module, wherein the module comprises:
a housing configured to load the module through a front end of a panel, the housing comprising:
sides and a bottom that extend between a front end and a rear end of the housing;
a set of inversely shaped guides recessed into the sides of the housing at the front end;
a relief receptor positioned at the rear end of the module; and
a set of tabs extending from the sides of the housing at the front end; and
at least one securing member corresponding to the set of tabs and configured to secure the module to a faceplate of a panel,
a connector cluster positioned at the front end of the housing and removably retained between the walls within the set of inversely shaped guides,
a strain relief insertable into the relief receptor at a rear end of the module and configured to be coupled to a trunk cable; and
fitting the module to the panel through one of a front of the panel and a rear of the panel based on a configuration of the at least one securing member.

19. The apparatus of claim 1, further comprising:
a slack housing fit in the housing of the module and configured to hold slack cable within the module.

20. The apparatus of claim 9, further comprising:
a slack housing fit in the housing of the module and configured to hold slack cable within the module.

* * * * *